United States Patent
Xue et al.

(10) Patent No.: US 12,302,412 B2
(45) Date of Patent: May 13, 2025

(54) COORDINATED CHANNEL ACCESS TECHNIQUES FOR SIDELINK COMMUNICATIONS

(71) Applicant: QUALCOMM Incorporated, San Diego, CA (US)

(72) Inventors: Yisheng Xue, San Diego, CA (US); Giovanni Chisci, San Diego, CA (US); Chih-Hao Liu, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/824,660

(22) Filed: May 25, 2022

(65) Prior Publication Data
US 2023/0389088 A1  Nov. 30, 2023

(51) Int. Cl.
*H04W 74/08* (2024.01)
*H04W 74/0808* (2024.01)

(52) U.S. Cl.
CPC ... *H04W 74/0875* (2013.01); *H04W 74/0808* (2013.01)

(58) Field of Classification Search
None
See application file for complete search history.

(56) References Cited

U.S. PATENT DOCUMENTS

2022/0078845 A1*  3/2022  Xu .............. H04W 74/002
2024/0196433 A1*  6/2024  Ji .............. H04W 74/0808

* cited by examiner

*Primary Examiner* — Clemence S Han
(74) *Attorney, Agent, or Firm* — Dalei Dong; Holland & Hart LLP

(57) ABSTRACT

Methods, systems, and devices for wireless communications are described that provide for user equipment (UE) in sidelink communications to agree on transmission directions and a traffic pattern for a sidelink channel, where a transmitting UE has higher priority in channel access than a receiving UE. When establishing a connection via sidelink, two or more UEs may agree on a resource pattern for a set of sidelink resources where a first UE has higher priority than a second UE for a first subset of resources. The first UE may be given higher priority in the first subset of resources through adjustments to a channel access procedure for requesting channel access, adjustments to one or more access thresholds or channel access priority classes, contention window adjustments, or any combinations thereof. Layer one signaling may be used to reconfigure channel access priority and the traffic pattern between UEs.

28 Claims, 15 Drawing Sheets

COORDINATED CHANNEL ACCESS TECHNIQUES FOR SIDELINK COMMUNICATIONS

FIELD OF TECHNOLOGY

The following relates to wireless communications, including coordinated channel access techniques for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be known as user equipment (UE). In some wireless communications systems, UEs may be capable of performing direct communications with one or more other UEs in a device-to-device (D2D) connection (e.g., a sidelink connection). Improved techniques for direct D2D communications in a wireless communications system may be desirable.

SUMMARY

The described techniques relate to improved methods, systems, devices, and apparatuses that support coordinated channel access techniques for sidelink communications. In accordance with various aspects, described techniques provide for user equipment (UE) in sidelink communications to agree on transmission directions and a traffic pattern for a sidelink channel, where a transmitting UE has higher priority in channel access than a receiving UE. In some cases, when establishing a connection via sidelink (e.g., a unicast connection), two UEs may agree on a resource pattern for a set of resources (e.g., a sidelink resource pool) where a first UE has higher priority than a second UE for a first subset of resources (e.g., a first set of time domain intervals). This higher priority may enhance the likelihood that the first UE gains channel access in the first subset of resources, which may allow for higher data rates and increased probability of meeting quality of service (QoS) targets. In some cases, the first UE is given higher priority in the first subset of resources through the second UE not attempting channel access in the first subset of resources, the second UE attempting channel access at a lower rate than the first UE, the second UE attempting channel access only in resources indicated by the first UE, adjustments to energy detection (ED) thresholds at the second UE, different channel access priority classes (CAPCs) for the UEs, a cyclic prefix (CP) length adjustment, contention window (CW) adjustment for the second UE, the second UE attempting channel access based on the first UE giving a channel occupancy time (COT) sharing indication, or any combinations thereof. Additionally, or alternatively, layer one (L1) signaling may be used to reconfigure channel access priority between UEs.

A method for wireless communication at a first user equipment (UE) is described. The method may include receiving an indication of a set of available wireless resources for communications with a second UE using a unicast connection via a sidelink channel, transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with a channel access procedure, and communicating with the second UE via the sidelink channel, where access to the sidelink channel is based on the channel access procedure and the pattern of resources.

An apparatus for wireless communication at a first UE is described. The apparatus may include a processor, memory coupled with the processor, and instructions stored in the memory. The instructions may be executable by the processor to cause the apparatus to receive an indication of a set of available wireless resources for communications with a second UE using a unicast connection via a sidelink channel, transmit, to the second UE, an indication of a pattern of resources within the set of available resources, the pattern of resources including at least a first subset of time domain resources in which the first UE has a higher priority than the second UE for initiating a channel access procedure for access to the sidelink channel in accordance with a channel access procedure, and communicate with the second UE via the sidelink channel, where access to the sidelink channel is based on the channel access procedure and the pattern of resources.

Another apparatus for wireless communication at a first UE is described. The apparatus may include means for receiving an indication of a set of available wireless resources for communications with a second UE using a unicast connection via a sidelink channel, means for transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with a channel access procedure, and means for communicating with the second UE via the sidelink channel, where access to the sidelink channel is based on the channel access procedure and the pattern of resources.

A non-transitory computer-readable medium storing code for wireless communication at a first UE is described. The code may include instructions executable by a processor to receive an indication of a set of available wireless resources for communications with a second UE using a unicast connection via a sidelink channel, transmit, to the second UE, an indication of a pattern of resources within the set of available resources, the pattern of resources including at least a first subset of time domain resources in which the first UE has a higher priority than the second UE for initiating a channel access procedure for access to the sidelink channel in accordance with a channel access procedure, and communicate with the second UE via the sidelink channel, where access to the sidelink channel is based on the channel access procedure and the pattern of resources.

In some examples of the method, apparatuses, and non-transitory computer-readable medium described herein, the transmitting may include operations, features, means, or instructions for transmitting a time domain pattern of resources to the second UE, where the first subset of resources include a subset of time domain intervals within the set of available resources. In some examples of the method, apparatuses, and non-transitory computer-readable medium described herein, the second UE is to refrain from initiating the channel access procedure within the first subset of resources.

Some examples of the method, apparatuses, and non-transitory computer-readable medium described herein may further include operations, features, means, or instructions for selecting a first contention window duration associated with the channel access procedure, and where the first contention window duration is shorter than a second contention window duration of the second UE and initiating the channel access procedure based on the first contention window duration. In some examples of the method, apparatuses, and non-transitory computer-readable medium described herein, the transmitting may include operations, features, means, or instructions for transmitting a preferred resource indication to the second UE that identifies resources that are available for the second UE to perform the channel access procedure. In some examples of the method, apparatuses, and non-transitory computer-readable medium described herein, the first subset of resources are associated with resources that are non-preferred resources at the second UE and the second UE is to refrain from performing the channel access procedure in the non-preferred resources.

In some examples of the method, apparatuses, and non-transitory computer-readable medium described herein, the channel access procedure includes a listen before talk (LBT) procedure that indicates channel availability of a shared radio frequency spectrum band that contains the set of available wireless resources, and where the first UE uses first listen-before-talk (LBT) parameters that provide a higher probability of channel access than second LBT parameters of the second UE for the first subset of resources. In some examples of the method, apparatuses, and non-transitory computer-readable medium described herein, the first LBT parameters include a first energy detection (ED) threshold that is higher than a second ED threshold of the second LBT parameters. In some examples of the method, apparatuses, and non-transitory computer-readable medium described herein, the first UE uses a lower channel access priority class (CAPC) for the channel access procedure than a CAPC of the second UE. In some examples of the method, apparatuses, and non-transitory computer-readable medium described herein, the first UE uses a longer cyclic prefix (CP) duration from a first automatic gain control symbol in the first subset of resources than a CP duration of the second UE.

Some examples of the method, apparatuses, and non-transitory computer-readable medium described herein may further include operations, features, means, or instructions for transmitting, to the second UE, a channel occupancy time (COT) sharing indication that indicates the second UE can attempt channel access in a COT that the first UE obtained, and where the second UE is to refrain from performing the channel access procedure in an absence of the COT sharing indication. In some examples of the method, apparatuses, and non-transitory computer-readable medium described herein, the first UE uses a CAPC that provides a shorter deferral value or a smaller contention window for the channel access procedure than the second UE.

Some examples of the method, apparatuses, and non-transitory computer-readable medium described herein may further include operations, features, means, or instructions for determining to prioritize the first UE for the first subset of resources based on a number of connections with other UEs that are served at the first UE. Some examples of the method, apparatuses, and non-transitory computer-readable medium described herein may further include operations, features, means, or instructions for transmitting, to the second UE, a reconfiguration message that indicates a changed priority associated with one or more subsets of resources of the set of available resources. Some examples of the method, apparatuses, and non-transitory computer-readable medium described herein may further include operations, features, means, or instructions for transmitting, responsive to obtaining channel access based on the channel access procedure, a COT sharing indication to the second UE that indicates the pattern of resources within an obtained COT in which the first UE has a higher priority than the second UE for initiating the channel access procedure.

DETAILED DESCRIPTION

Figure 1:
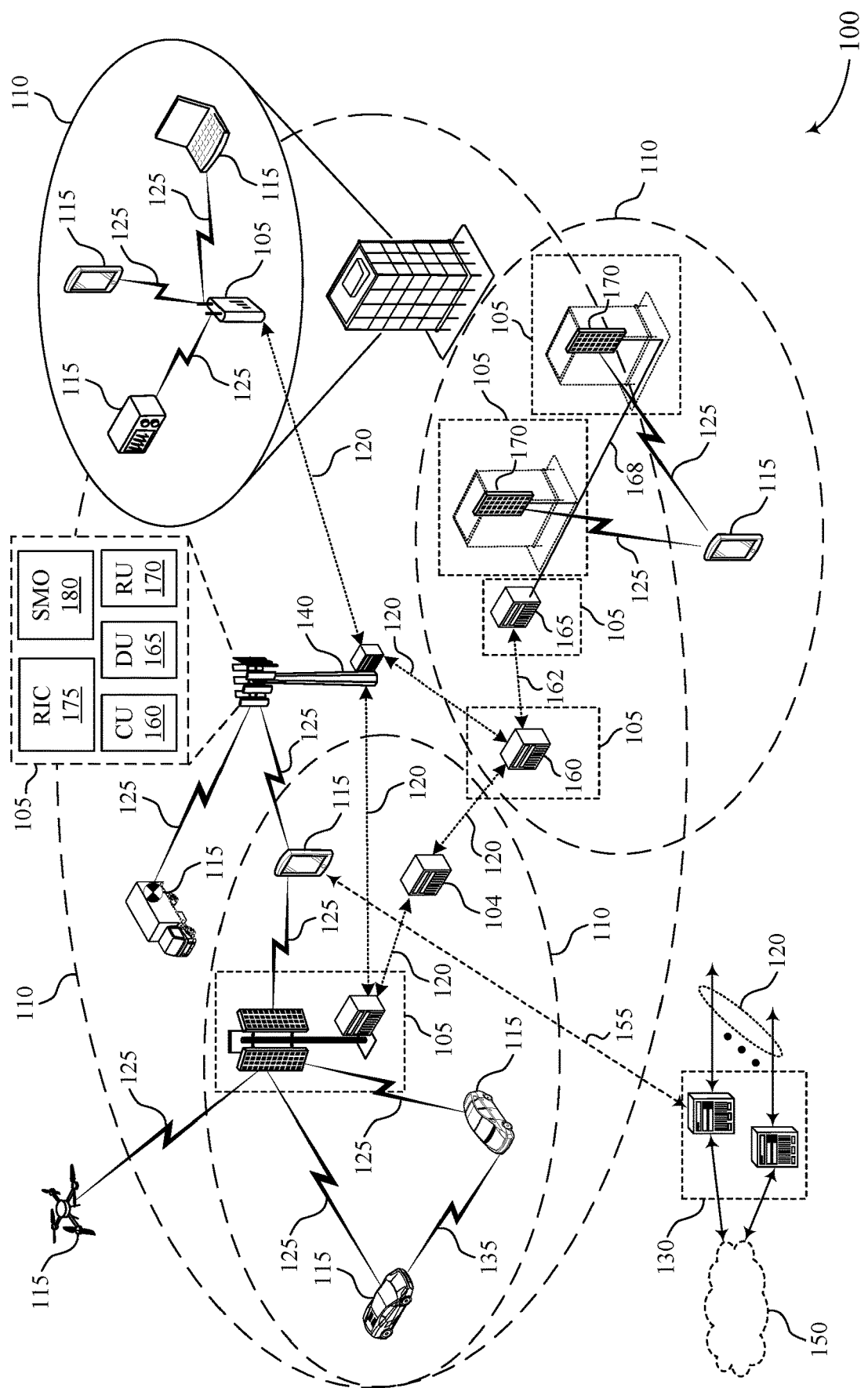
FIG. 1 illustrates an example of a wireless communications system that supports coordinated channel access techniques for sidelink communications in accordance with one or more aspects of the present disclosure.

In some wireless communications systems, devices may operate using sidelink communications in which devices communicate directly with other like devices (e.g., a user equipment (UE) may communicate directly with another UE) where some or all of the communications are not routed through another network node. In some cases, sidelink communications may be configured in which a set of time resources, frequency resources (e.g., a bandwidth part (BWP) of an operating frequency bandwidth), or both may contain one or more resource pools, and physical layer channels (e.g., physical sidelink control channel (PSCCH), physical sidelink shared channel (PSSCH)) may be configured per resource pool. Devices that use sidelink communications may receive configuration information that indicates parameters associated with one or more resource pools, and communicate in accordance with such configuration information. In some cases, resources for sidelink communications may be provided based on different resource allocation modes, such as a first mode (e.g., Mode 1) in which sidelink resources are scheduled by a network entity (e.g., a base station assigns resources for sidelink transmission, such as dynamic allocation via downlink control information or configured transmissions), and a second mode (e.g., Mode 2) where a sidelink device may autonomously select sidelink resources from one or more configured sidelink resource pools (e.g., based on a channel sensing mechanism). In some cases, sidelink communications also may use unlicensed or shared radio frequency spectrum, in which a channel sensing mechanism may be used for channel access (e.g., in a contention-based listen-before-talk channel access procedure).

Further, many existing uses for sidelink communications provide that a transmitting device broadcasts communications to multiple receiving devices. For example, a vehicle in a vehicle-to-vehicle (V2V) communications scheme may broadcast safety messages to any other vehicles in the vicinity. Such broadcast communications often do not carry substantial amounts of data, and may have relatively relaxed quality of service (QoS) targets. However, additional use cases for sidelink communications may be desirable, such as for transmission of unicast data between devices. Such unicast connections may carry substantially more data than broadcast sidelink communications, such as enhanced mobile broadband (eMBB) data or extended reality (XR) data. Further, eMBB or XR applications may have more stringent QoS targets than broadcast messages (e.g., V2V safety messages), and thus such communications may result in higher system loading. In some cases, higher loading of links by a transmitting UE, coupled with channel access delays that may occur in Mode 2 sidelink communications that use channel access techniques based on channel sensing, may make it difficult to maintain QoS targets. Thus, coordination of channel access between a transmitting UE and one or more receiving UEs may be beneficial to increase the likelihood of channel access at the transmitting UE.

In accordance with various aspects discussed herein, techniques are provided for UEs in sidelink communications to exchange information on transmission directions and a traffic pattern for a sidelink channel, where a transmitting UE has higher priority in channel access than a receiving UE. In some cases, when establishing a connection via sidelink (e.g., a unicast connection), two UEs may agree on a resource pattern for a set of resources (e.g., a sidelink resource pool) where a first UE has higher priority than a second UE for a first subset of resources (e.g., a first set of time domain intervals). This higher priority may enhance the likelihood that the first UE gains channel access in the first subset of resources, which may allow for higher data rates and increased probability of meeting QoS targets for data that is transmitted using the channel. In some cases, the first UE is given higher priority in the first subset of resources through channel access technique adjustment that provides the first UE with a higher priority in the first subset of resources. For example, the second UE may not attempt channel access in the first subset of resources, the second UE may attempt channel access at a lower rate than the first UE in the first subset of resources, or the second UE may attempt channel access only in resources of the first subset of resources that are indicated by the first UE. In some cases, additionally, or alternatively, the first UE may have higher priority in the first subset of resources through adjustments to one or more thresholds for channel access at the first UE and the second UE. For example, energy detection (ED) thresholds at the first UE and the second UE may be set to enhance the likelihood of the first UE gaining channel access. In further cases, different channel access priority classes (CAPCs) may be provided for the UEs, a cyclic prefix (CP) length adjustment may be applied, or a contention window (CW) for channel access may be adjusted for the second UE. In some cases, the second UE may attempt channel access based on the first UE giving a channel occupancy time (COT) sharing indication. Additionally, UEs may use any combinations of one or more techniques to provide a higher priority for the first UE in the first subset of resources. Additionally, in some cases, layer one (L1) signaling may be used to reconfigure channel access priority between UEs, such as based on updated traffic that is to be exchanged between UEs.

Such techniques may provide for enhanced reliability and efficiency for sidelink communications. For example, providing a first UE that transmits more data than a second UE with prioritized channel access may allow for more efficient use of the wireless resources and also enhance QoS of the communications. Further, in many cases the traffic pattern may be a time domain pattern (e.g., which may be beneficial in cases where channel sensing is used to determine channel access), and each of the UEs in the sidelink communications are aware of the traffic pattern which may provide mitigation for half-duplex deafness in which a UE is not able to receive communications while attempting transmissions. Exchanging a traffic pattern between UEs, and establishing a particular UE as having a higher priority for a subset of resources, may allow for each UE to appropriately monitor for communications and perform channel access for transmitting data, which may reduce instances of half-duplex deafness, enhance overall efficiency of the network, and reduce overhead associated with repeated transmissions that may be necessary if communications are not received at a receiving device.

Aspects of the disclosure are initially described in the context of wireless communications systems. Aspects of the disclosure are further illustrated by and described with reference to resource diagrams, a process flow, apparatus diagrams, system diagrams, and flowcharts that relate to coordinated channel access techniques for sidelink communications.

FIG. 1 illustrates an example of a wireless communications system 100 that supports coordinated channel access techniques for sidelink communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support coordinated channel access techniques for sidelink communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, in which case $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In various aspects, two or more UEs 115 in sidelink communications (e.g., direct communications between devices using a PC5 connection) may coordinate channel access on a sidelink channel using techniques discussed herein. In some cases, two or more UEs 115 may agree on transmission directions and a traffic pattern for the sidelink channel, where a transmitting UE 115 (e.g., a UE 115 with a larger amount of data to be transmitted) has higher priority in channel access than a receiving UE 115 (e.g., a UE 115 with a smaller amount of data to be transmitted). In some cases, when establishing a connection via sidelink, the two or more UEs 115 may agree on a resource pattern for a set of sidelink resources where the transmitting UE 115 has higher priority than the receiving UE 115 for a first subset of resources. The transmitting UE 115 may be given higher priority in the first subset of resources through adjustments to a channel access procedure for requesting channel access, adjustments to one or more access thresholds or CAPCs, CW adjustments, or any combinations thereof. Further, in some cases, L1 signaling may be used to reconfigure channel access priority and the traffic pattern between UEs 115.

Figure 2:
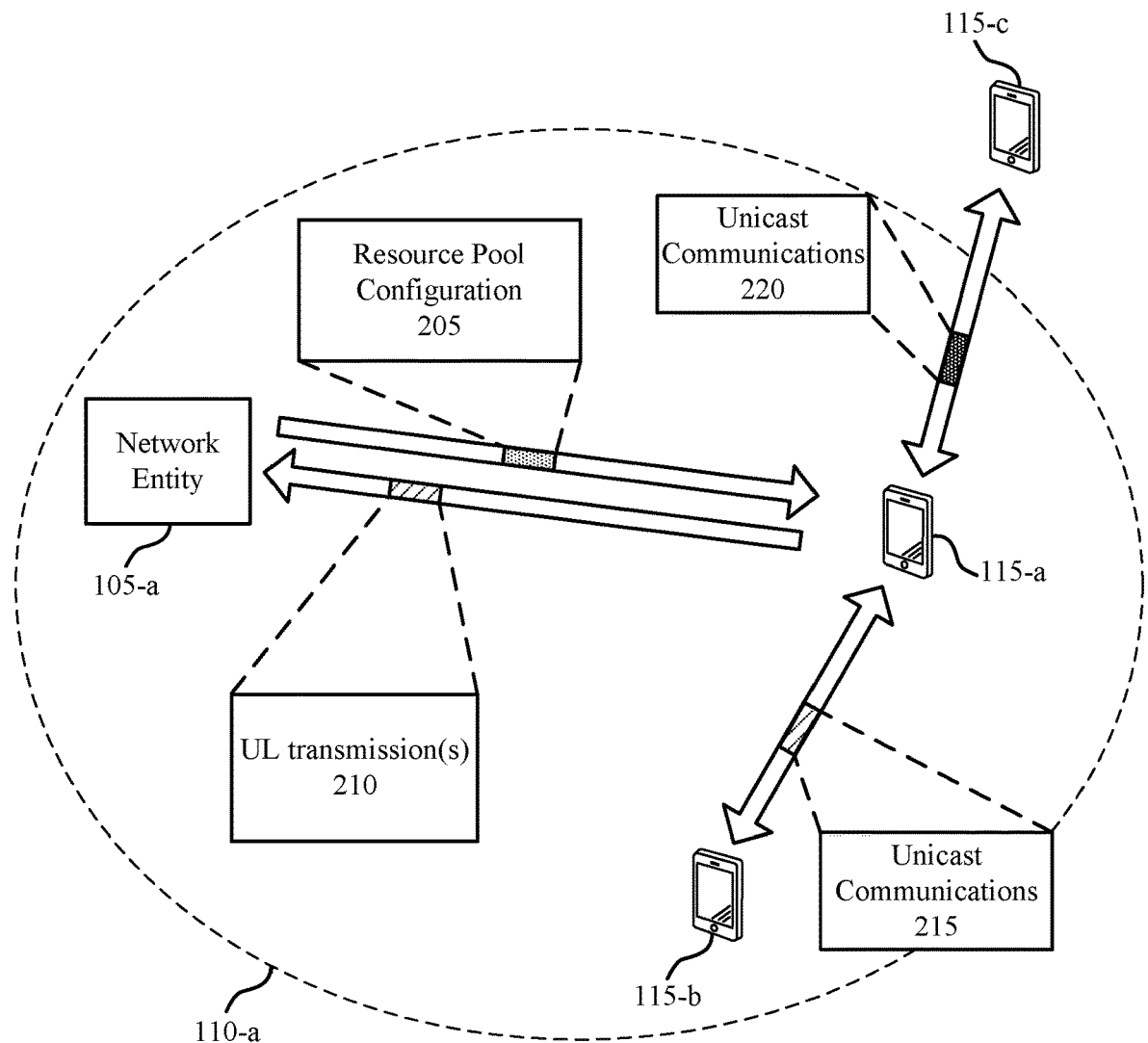
FIG. 2 illustrates an example of a wireless communications system that supports coordinated channel access techniques for sidelink communications in accordance with one or more aspects of the present disclosure.

FIG. 2 illustrates an example of a wireless communications system 200 that supports coordinated channel access techniques for sidelink communications in accordance with one or more aspects of the present disclosure. The wireless communications system 200 includes a first UE 115-a and a second UE 115-b, which may be examples of UEs 115 described with reference to FIG. 1. The wireless communications system 200 also includes a network entity 105-a, which may be an example of a network entity 105 described with reference to FIG. 1. The network entity 105-a may provide communication coverage for UEs 115 in a geographic coverage area 110-a, which may be an example of a geographic coverage area 110 described with reference to FIG. 1. The wireless communications system 200 may support efficient techniques for sidelink resource pool configuration and coordinated channel access for the sidelink resources, which may enhance efficiency and reliability for sidelink communications. It is noted that while various examples discussed herein refer to UEs 115 as sidelink communications devices, the techniques as discussed herein may be applied for any devices that participate in direct communications with other like devices, such as IAB nodes or other network nodes.

In this example, network entity 105-a may transmit a resource pool configuration 205 (e.g., an indication of various parameters for one or more sidelink resource pools) to UEs 115 that are to use sidelink communications, including a first UE 115-a, a second UE 115-b, and a third UE 115-c in this example. In some cases, the resource pool configuration 205 may be transmitted to the first UE 115-a which may then provide information related to the resource pool to other sidelink UEs 115 (e.g., that do not have an access link or are outside of the geographic coverage area 110-a). Additionally, or alternatively, the resource pool configuration 205 may be transmitted to multiple UEs 115, including both the first UE 115-a and the second UE 115-b, that may be within the geographic coverage area 110-a, and a third UE 115-c that is outside of the coverage area 110-a may receive an indication of the resource pool configuration 205 via the first UE 115-a. In the example of FIG. 2, the first UE 115-a may transmit one or more uplink transmissions 210 to the network entity 105-a (e.g., capability information, sidelink resource pool request information, acknowledgments of successful receipt of configuration information, or other information). In this example, the first UE 115-a may engage in unicast communications 215 with the second UE 115-b based on the resource pool configuration 205. Likewise, the first UE 115-a may engage in unicast communications 220 with the third UE 115-c based on the resource pool configuration 205.

As discussed herein, in some cases the sidelink resource pool may include resources that are to be scheduled according to Mode 2 techniques, where sidelink devices may autonomously select sidelink resources from the configured sidelink resource pool (e.g., based on a channel sensing mechanism). Further, in some cases, shared radio frequency spectrum may be used for sidelink communications, where a LBT procedure is used in order to access wireless resources for the sidelink communications. In the example of FIG. 2, the first UE 115-a and the second UE 115-b may exchange data through unicast communications 215 using the sidelink channel. In some cases, such communications may include eMBB or XR communications that may have a relatively high data rate, relatively stringent QoS targets, or both. Such sidelink communications may have higher loading levels than broadcast-type sidelink communications (e.g., that may be used in V2X communications), and channel access techniques as discussed herein may allow for more efficient transmissions of the unicast communications 215. Likewise, the first UE 115-a and the third UE 115-c may exchange data through unicast communications 220 using the sidelink resources, and efficient channel access techniques may allow for efficient allocation of the available sidelink resources in the resource pool.

When participating in sidelink communications over a channel that uses channel access techniques such as channel sensing, TDD techniques may be used and a UE 115 that is in a transmit state may not be able to monitor for communications from other UEs 115, resulting in what is referred to as half-duplex deafness. Further, contention-based channel access techniques such as may be used for sidelink resources configured for Mode 2 communications or in shared radio frequency spectrum, in addition to half-duplex deafness, may result in COT collisions in some cases, and a UE 115 that has data to transmit may in some situations be starved of resources. In such cases, QoS targets of communications may not be met and overall communications quality may degrade and provide a poor user experience. In some cases, multiple repetitions of communications may be provided to help mitigate such half-duplex deafness, which may be effective for broadcast or groupcast communications, but may result in inefficiencies for unicast communications. Further, COT-based transmissions may be allowed in some cases (e.g., in frequency range 1 (FR1) unlicensed bands with LBT), in which after a Type 1 LBT a node may continuously transmit for a certain time period (e.g., up to 10 ms). In such cases, a collision will last up to the certain time period, which may also impact the ability of a transmitting device to achieve QoS targets. Techniques as discussed herein may help mitigate half-duplex deafness and COT collisions, and thereby enhance communications efficiency and reliability.

In accordance with some aspects, channel access coordination between the first UE 115-a and the second UE 115-b (and optionally the third UE 115-c) may allow for more reliable channel access by a UE 115 that has more data to transmit. For example, the first UE 115-a may have more data to transmit via unicast communications 215 than the second UE 115-b, in which case the first UE 115-a may be referred to as a transmitting device and the second UE 115-b may be referred to as a receiving device. In some cases, the first UE 115-a and the second UE 115-b may agree transmission direction and a traffic pattern, such that the first UE 115-a has a higher likelihood of gaining channel access for at least some sidelink resources, and thus a higher likelihood of transmitting data and meeting associated QoS targets. For example, a first subset of resources of the sidelink resource pool may be identified in which the first UE 115-a has higher channel access priority, and a second subset of resources may be identified in which the first UE 115-a and other sidelink UEs 115 (e.g., second UE 115-b and third UE 115-c) have equal chances for channel access. In further, examples, more than two subsets of resources may be identified, with different UEs 115 or combinations or UEs 115 having channel access priority for different subsets of resources. Examples of different subsets of resources and channel access priorities are discussed with reference to FIGS. 3 and 4.

In some cases, the UEs 115 may reconfigure channel access priorities, subsets of resource pools in which different devices have higher priority, or any combinations thereof. In some cases, dynamic reconfiguration may be performed in which UEs 115 may change the channel access priority pattern via L1 signaling. In some cases, a primary device such as the first UE 115-a may be agreed to or elected when a unicast connection is established, and the primary device may dynamically re-configure the channel access priority pattern (e.g., similarly to network entity 105-a sending a downlink control information (DCI) 2-0 in a 5G system). In other cases, any UE 115, including a secondary device that is not a primary device, may transmit L1 signaling at a slot where it has priority (e.g., when a receiving device has lower priority) to dynamically configure the channel access pattern in a coming number of slots (e.g., in an upcoming L slots). Additionally, or alternatively, when operating in unlicensed band imposed with LBT, any UE 115 may dynamically reconfigure (e.g., using L1 signaling) the channel access priority pattern for remaining duration within its COT, via sending signaling that indicates channel access priority (e.g., signaling similar to COT-structure information (COT-SI) signaling).

Figure 3:
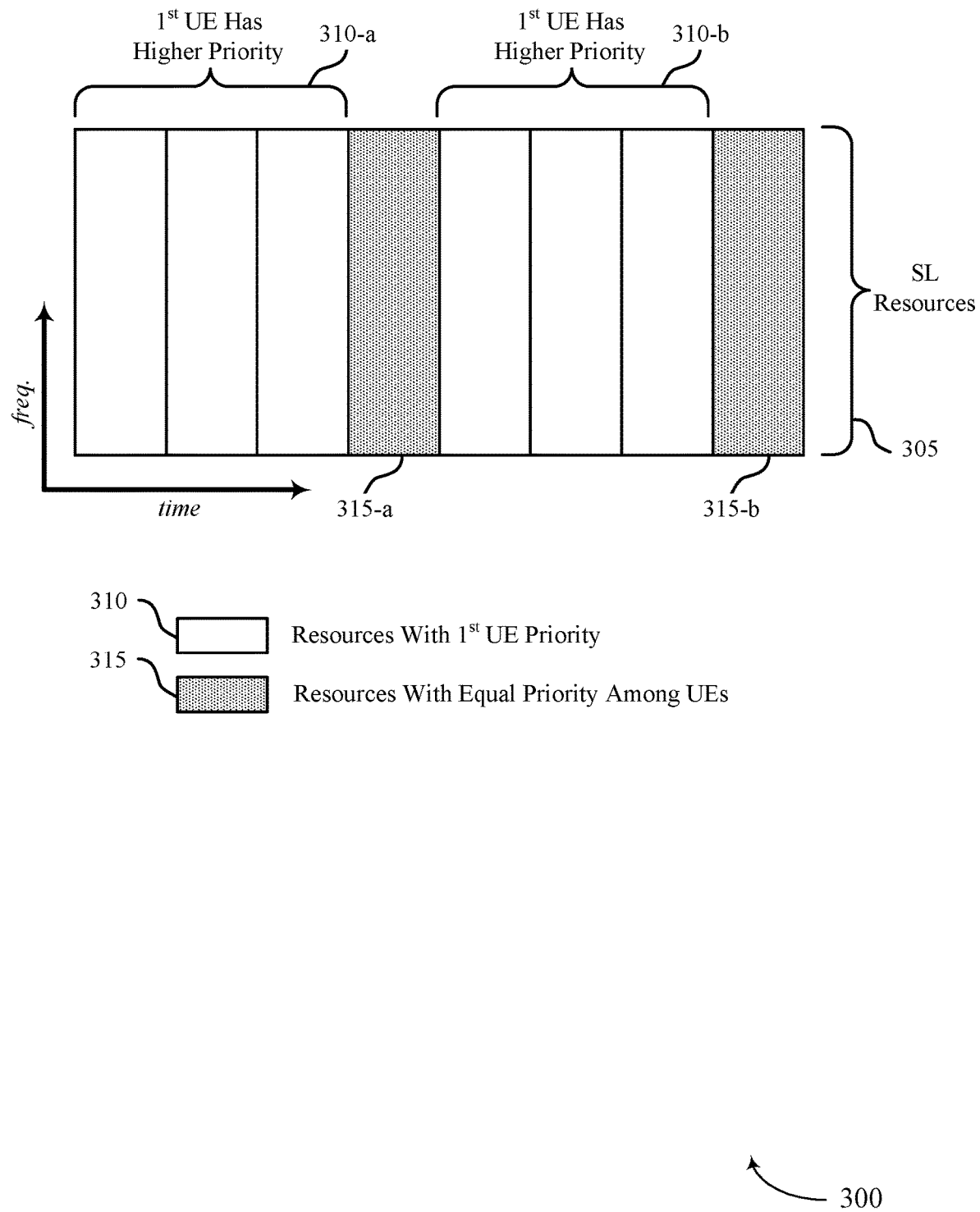
FIG. 3 illustrates an example of a sidelink resource usage pattern that supports coordinated channel access techniques for sidelink communications in accordance with one or more aspects of the present disclosure.

FIG. 3 illustrates an example of a sidelink resource usage pattern 300 that supports coordinated channel access techniques for sidelink communications in accordance with one or more aspects of the present disclosure. The sidelink resource usage pattern 300 may be implemented in a system that uses sidelink communications, such as in a wireless communications system 100 or 200 as described with reference to FIG. 1 or 2.

In the example, of FIG. 3, a set of sidelink resources 305 (e.g., that include all or part of a sidelink resource pool) may include a first subset of resources 310 in which a first UE has higher priority and a second subset of resources 315 in which all sidelink UEs have equal priority. In this example, the first subset of resources 310 and the second subset of resources are time domain resources, that are distributed across the set of sidelink resources 305 with a first portion of the first subset of resources 310-a and a second portion of the first subset of resources 310-b each followed by a first portion of the second subset of resources 315-a and a second portion of the second subset of resources 315-b, respectively. In other examples, more than two subsets of resources may be provided, partitions of frequency domain resources may be provided, or any combinations thereof. In some cases, the sidelink resources 305 may be licensed or dedicated resources for a particular operator. In other cases, sidelink resources 305 may be shared resources in an unlicensed or shared radio frequency spectrum band.

In some cases, the first subset of resources 310 and the second subset of resources 315 may be determined when a unicast connection between a first UE and a second UE is established (e.g., a unicast connection establishment over PC5 RRC). In some cases, a time-domain pattern may be determined at the first UE based on an amount of data that is to be transmitted to the second UE, and the time-domain pattern may include at least a set of intervals (e.g., slot-level intervals corresponding to the first subset of resources 310) where the first UE has a higher priority in channel access over the second UE. In some cases, the priority for the first UE may be achieved by providing that, upon receiving an indication of the first subset of resources 310, the second UE does not attempt channel access on the first subset of resources 310 and only attempts channel access on the second subset of resources 315 in accordance with non-priority channel access techniques (e.g., legacy Mode 2 sidelink channel access). In other cases, the second UE may attempt channel access using the first subset of resources 310 based on a random number generation in which access is attempted only if the generated random number is above or below a threshold value. In some cases, the threshold value may be adjusted based on a ratio of data that is expected to be transmitted by the first and second UEs, a priority of data to be transmitted by the first UE, QoS targets, and the like.

In other cases, additionally, or alternatively, the first UE may identify a portion of the first subset of resources 310 in which the second UE may attempt channel access, or a portion of the first subset of resources 310 in which the second UE is to refrain from attempting channel access. In some cases, when shared radio frequency spectrum resources are used for the sidelink resources 305, a lower priority of the second UE may be achieved by adjustments to the contention procedure (e.g., LBT procedure) for accessing the channel. For example, the second UE may use a lower energy detection (ED) threshold value in the LBT procedure than the first UE. Such a lower ED threshold value may result in a lower likelihood of the second UE detecting a clear channel than the first UE, and thus provide the first UE with increased likelihood of channel access. In other cases, the second UE may use a CAPC in Type 1 LBT that provides a reduced likelihood of successful channel access than a different CAPC used by the first UE (e.g., the second UE may use a CAPC with a larger contention window (CW) and longer deferral than used by the first UE). In further cases, the second UE may perform an LBT attempt upon receipt of a COT sharing indication from the first UE.

In some cases that use different CAPCs, the first UE may use a CAPC that is used for downlink communications from a network entity, and the second UE may use a CAPC that is associated with uplink communications. For example, the first UE may use a CAPC (e.g., CAPC 1 or CAPC 2 defined in the 3GPP 5G specifications) that has a shorter CW and a shorter deferral than are associated with uplink communications. In some cases, usage of a downlink CAPC configuration by the first UE may be available when certain conditions are met. For example, the first UE may use a downlink CAPC configuration in cases where the second UE only attempts access in resources indicated as preferred resources by the first UE or in resources in which the first UE indicates COT sharing. In other examples, the first UE may use a downlink CAPC configuration in cases where the first UE has a number of concurrent unicast sidelink connections that meet or exceed a first threshold value (e.g., the first UE has ≥X>0 concurrent unicast connections). In further examples, the first UE may use a downlink CAPC configuration in cases where the first UE has a number of concurrent unicast sidelink connections in which the second UE uses preferred resources or COT sharing for channel access, and the number of such concurrent connections meet or exceed a second threshold value (e.g., the first UE has ≥Y>0 (X>Y) concurrent unicast connections in which the second UE uses preferred resources or COT sharing for channel access). As discussed herein, in some cases one or more combinations of prioritization techniques may be used to prioritize the first UE for channel access in the first subset of resources 310. In some additional cases, enhanced likelihood of channel access by the first UE may be provided through CP adjustments, such as discussed with reference to FIG. 4.

Figure 4:
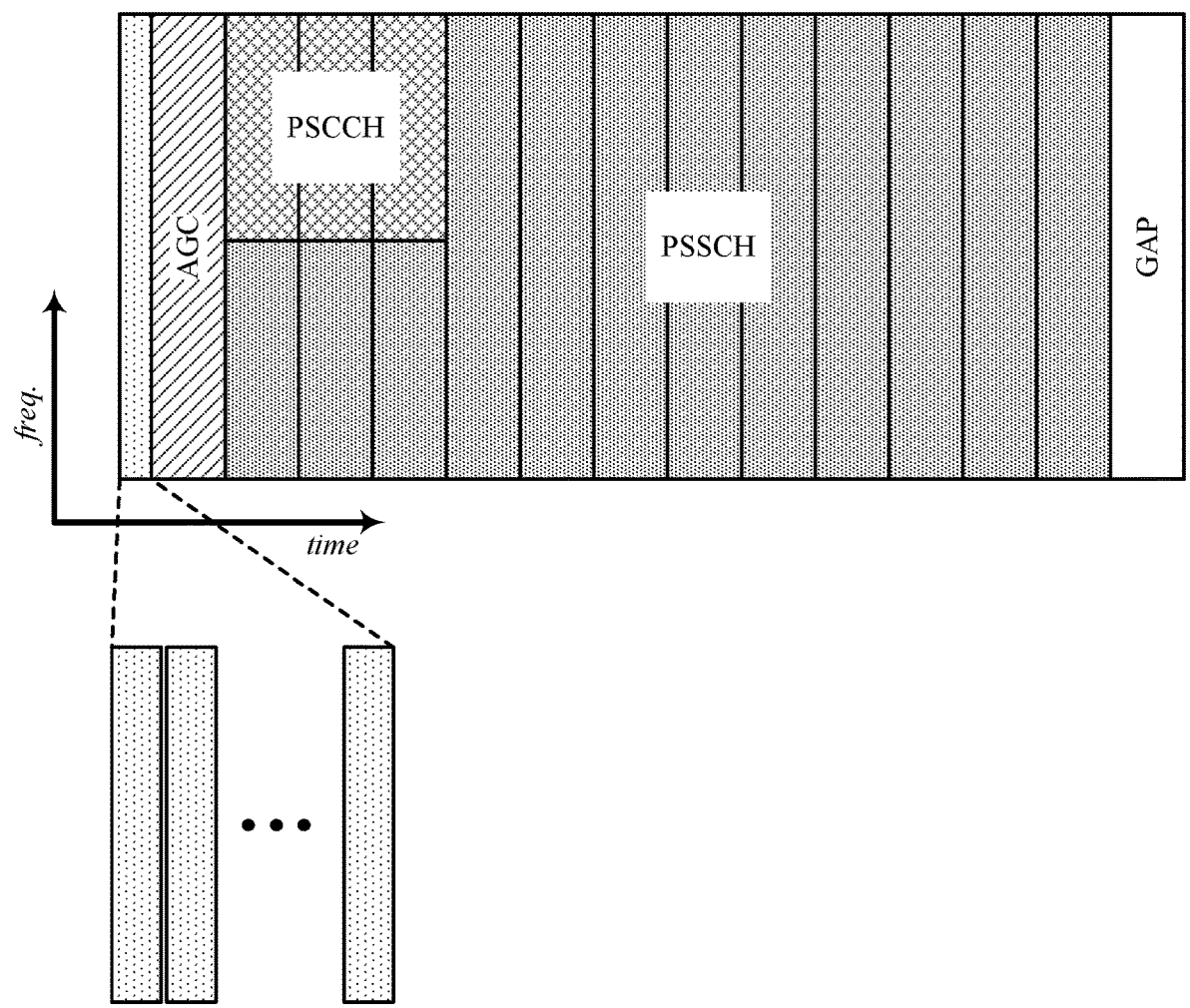
FIG. 4 illustrates an example of sidelink slot resources that support coordinated channel access techniques for sidelink communications in accordance with one or more aspects of the present disclosure.
Figure 4:
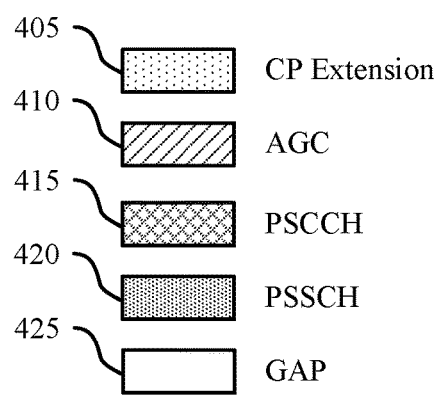

FIG. 4 illustrates an example of a sidelink slot resources 400 that supports coordinated channel access techniques for sidelink communications in accordance with one or more aspects of the present disclosure. The sidelink slot resources 400 may be implemented in a system that uses sidelink communications, such as in a wireless communications system 100 or 200 as described with reference to FIG. 1 or 2.

In the example, of FIG. 4, the sidelink slot resources 400 (e.g., that are included in a sidelink resource pool) may include number of symbols, including an automatic gain control (AGC) symbol 410, symbols that carry a PSCCH 415, symbols that carry a PSSCH 420, and a gap symbol 425. In some cases, transmissions of the AGC symbol 410 may use a CP extension 405 that results in a CP transmission starting in advance of the AGC symbol 410. In such cases, (e.g., in a deployment in an unlicensed band with LBT), higher priority channel access may be achieved with a longer CP extension 405 from the AGC symbol 410 into a preceding the gap symbol 425, such that when another UE is within the same collision domain, the other UE can only transmit in that slot when the higher priority UE does not. Further, in some cases, one or more lower priority UEs may be configured with a shorter CP extension or no CP extension. Thus, in slots in which the higher priority UE is to transmit, any lower priority UEs will not successfully complete the LBT procedure, which increases the likelihood of the higher priority UE obtaining channel access.

Figure 5:
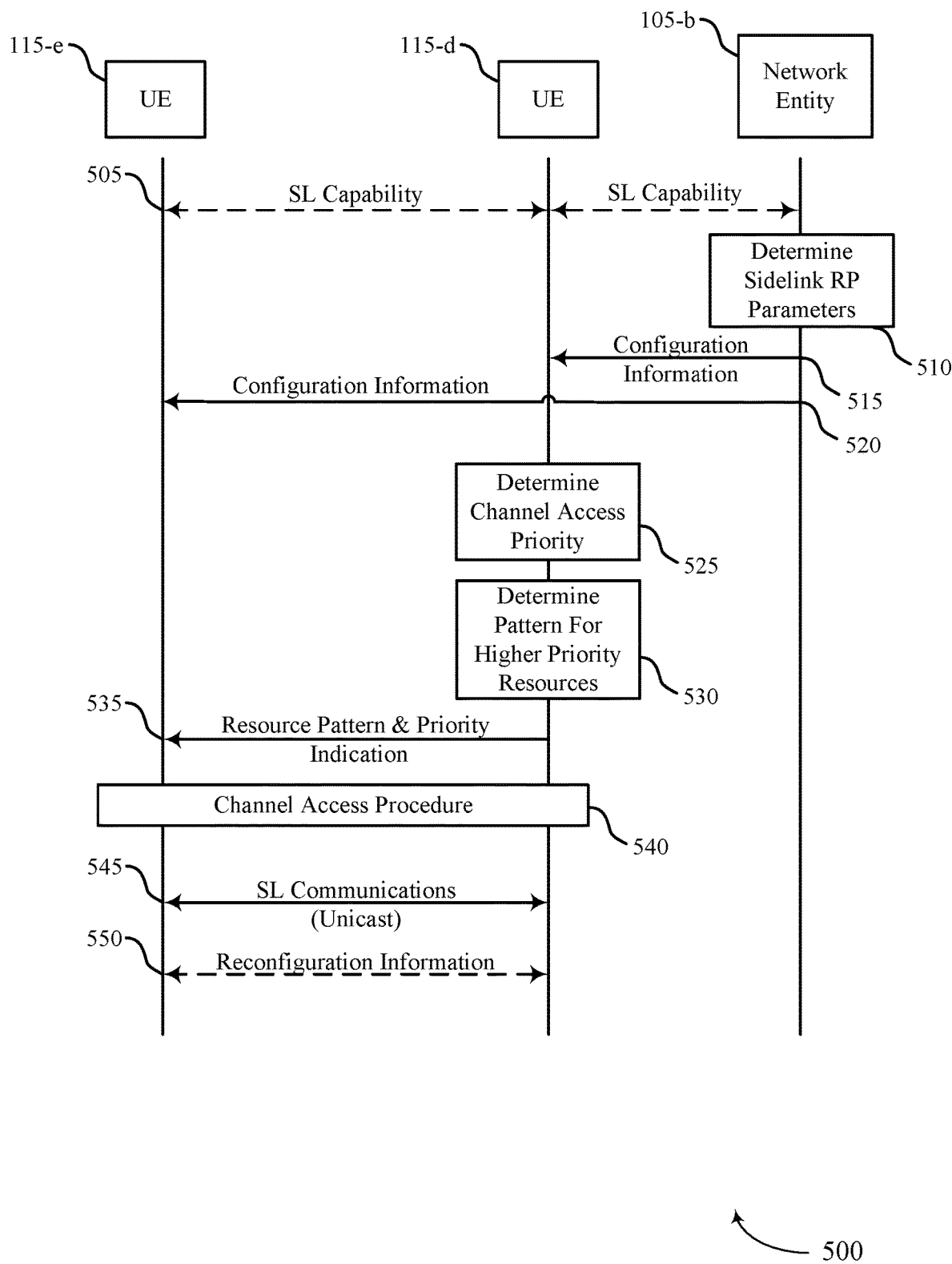
FIG. 5 illustrates an example of a process flow that supports coordinated channel access techniques for sidelink communications in accordance with one or more aspects of the present disclosure.

FIG. 5 illustrates an example of a process flow 500 that supports coordinated channel access techniques for sidelink communications in accordance with one or more aspects of the present disclosure. Process flow 500 includes first UE 115-d and second UE 115-e, which may be examples of UEs 115 described with reference to FIGS. 1-2. Process flow 500 also includes a network entity 105-b, which may be an example of a network entity 105 described with reference to FIGS. 1-2. The process flow 500 may implement aspects of wireless communications system 100 or 200. For example, the process flow 500 may support coordinated channel access techniques for sidelink communications.

In the following description of the process flow 500, the signaling exchanged between the UEs 115, and between the UEs 115 and the network entity 105, may be exchanged in a different order than the example order shown, or the operations performed by the UEs 115 and the network entity 105 may be performed in different orders or at different times. Some operations may also be omitted from the process flow 500, and other operations may be added to the process flow 500.

Optionally, at 505, the first UE 115-d and the second UE 115-e may exchange sidelink capabilities, which may also be exchanged with the network entity 105-b. Such sidelink capabilities may include information related to, for example, an ability of the UE 115 to perform prioritization for channel access for sidelink communications with other UEs 115. In some cases, a request or recommendation for one or more channel access prioritization configurations or parameters may be provided to the network entity 105-b. In some cases, such sidelink capability or request information may be provided in RRC signaling, in a MAC control element (MAC-CE), in uplink control information, in sidelink control information (SCI), or any combinations thereof.

At 510, the network entity 105-b may determine sidelink resource pool parameters. In some cases, the network entity 105-b may determine a set of sidelink resources for a sidelink resources pool that is configured for Mode 2 sidelink operation in which UEs 115 autonomously determine resourced to use for sidelink communications. In some cases, the sidelink resource pool may be one or multiple configured sidelink resource pools, one or more of which may be configured for Mode 1 operation, for Mode 2 operation without channel access prioritization, for Mode 2 operation with channel access prioritization, or any combinations thereof. At 515, the network entity 105-b may transmit the configuration information to the first UE 115-d, and at 520 the network entity 105-b may transmit the configuration information to the second UE 115-e.

At 525, the first UE 115-d may determine a channel access priority for sidelink resources of the sidelink resource pool. In some cases, the channel access priority may be determined based at least in part on an amount of higher priority data to be transmitted to the second UE 115-e via a unicast connection, a type of data to be transmitted to the second UE 115-e via the unicast connection, a QoS associated with the data, or any combinations thereof.

At 530, the first UE 115-d may determine a pattern for higher priority resources for transmission of the higher priority data to the second UE 115-e via the unicast connection. In some cases, the pattern for higher priority resources may be a time-domain pattern that is based on an amount of data to be transmitted from the first UE 115-d, a ratio of data to be transmitted by the first UE 115-d and the second UE 115-e, a type of data to be transmitted, QoS targets associated with the data, a priority indication associated with the data, or any combinations thereof.

At 535, the first UE 115-d may transmit a resource pattern and priority indication to the second UE 115-e. In some cases, the resource pattern indication may be transmitted via a PC5 RRC message, via a MAC-CE, in SCI, or any combinations thereof. At 540, the first UE 115-d and second UE 115-e may perform a channel access procedure to gain channel access based on the resource pattern and priority indication. As discussed herein, the channel access procedure may be a channel sensing based access procedure to access Mode 2 sidelink resources, may be a contention-based channel access procedure (e.g., a LBT procedure) for shared radio frequency spectrum resources, or any combinations thereof. At 545, the first UE 115-d and the second UE 115-e may perform sidelink communication via a unicast connection in accordance with the channel access and priority. Optionally, at 550, the first UE 115-d and the second UE 115-e may exchange reconfiguration information, which may change channel access priority, adjust subsets of resource in which priority is provided, or any combinations thereof.

Figure 6:
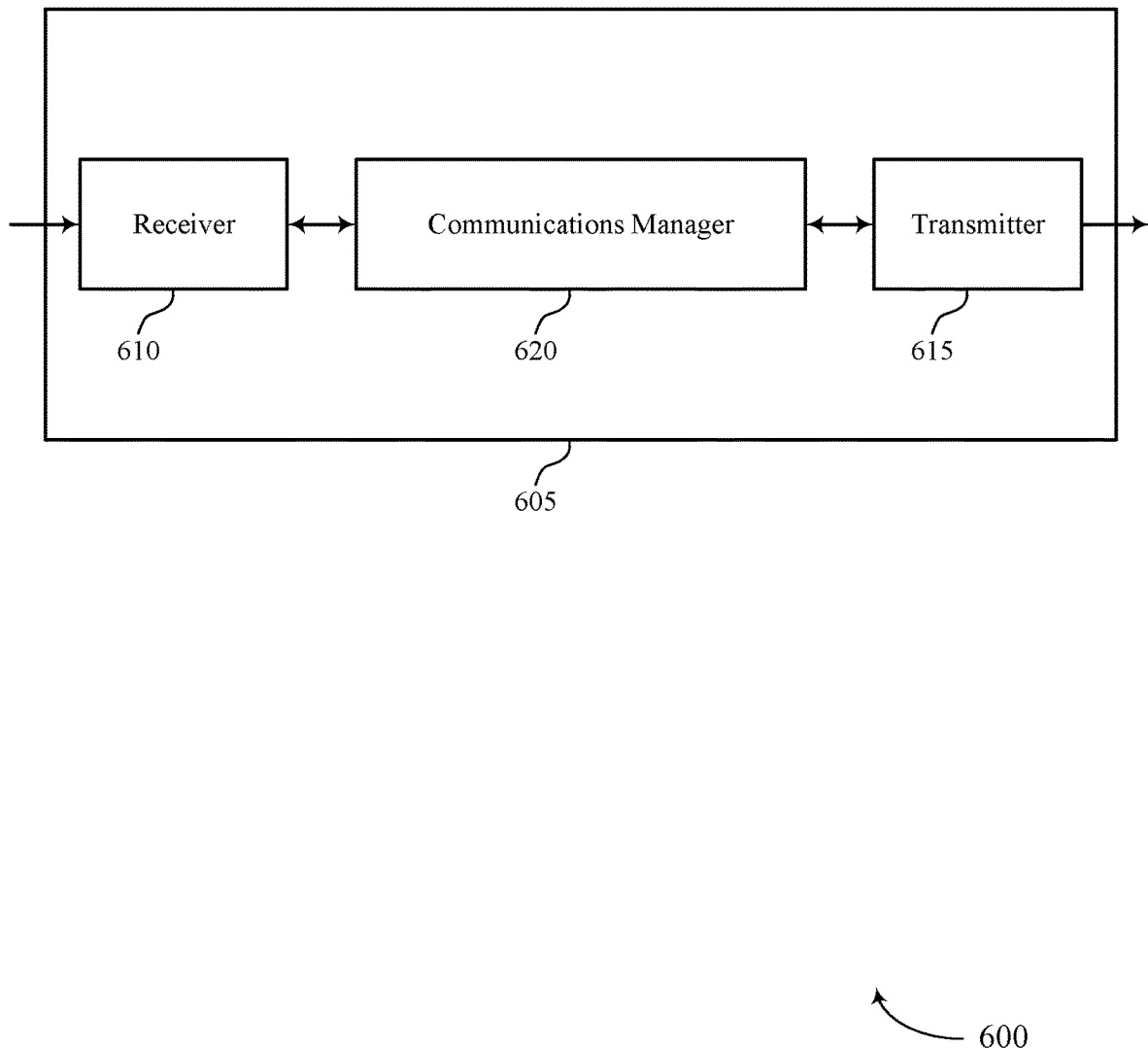
FIGS. 6 and 7 show block diagrams of devices that support coordinated channel access techniques for sidelink communications in accordance with one or more aspects of the present disclosure.

FIG. 6 shows a block diagram 600 of a device 605 that supports coordinated channel access techniques for sidelink communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to coordinated channel access techniques for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to coordinated channel access techniques for sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of coordinated channel access techniques for sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. For example, the communications manager 620 may be configured as or otherwise support a means for receiving an indication of a set of available resources for communications with a second UE using a unicast connection via a sidelink channel. The communications manager 620 may be configured as or otherwise support a means for transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The communications manager 620 may be configured as or otherwise support a means for communicating with the second UE via the sidelink channel, where access to the sidelink channel is based on the channel access procedure and the pattern of resources.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for sidelink channel access prioritization that provide for enhanced reliability and efficiency for sidelink communications. For example, a first UE that transmits more data than a second UE with prioritized channel access may allow for more efficient use of the wireless resources and also enhance QoS of the communications, provide mitigation for half-duplex deafness, enhance overall efficiency of the network, reduce overhead associated with repeated transmissions that may be necessary if communications are not received at a receiving device, or any combinations thereof.

Figure 7:
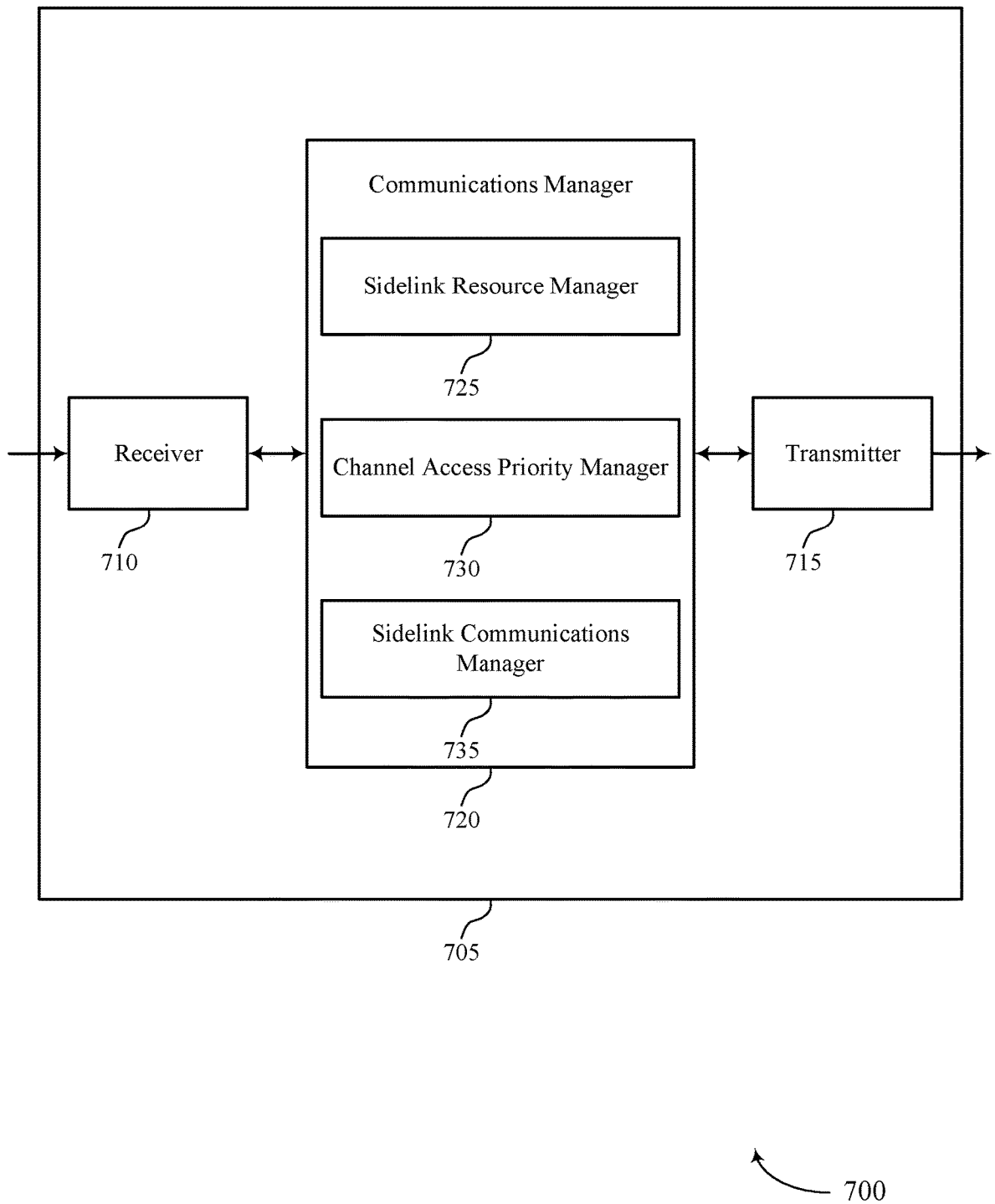

FIG. 7 shows a block diagram 700 of a device 705 that supports coordinated channel access techniques for sidelink communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to coordinated channel access techniques for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to coordinated channel access techniques for sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of coordinated channel access techniques for sidelink communications as described herein. For example, the communications manager 720 may include a sidelink resource manager 725, a channel access priority manager 730, a sidelink communications manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. The sidelink resource manager 725 may be configured as or otherwise support a means for receiving an indication of a set of available resources for communications with a second UE using a unicast connection via a sidelink channel. The channel access priority manager 730 may be configured as or otherwise support a means for transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The sidelink communications manager 735 may be configured as or otherwise support a means for communicating with the second UE via the sidelink channel, where access to the sidelink channel is based on the channel access procedure and the pattern of resources.

Figure 8:
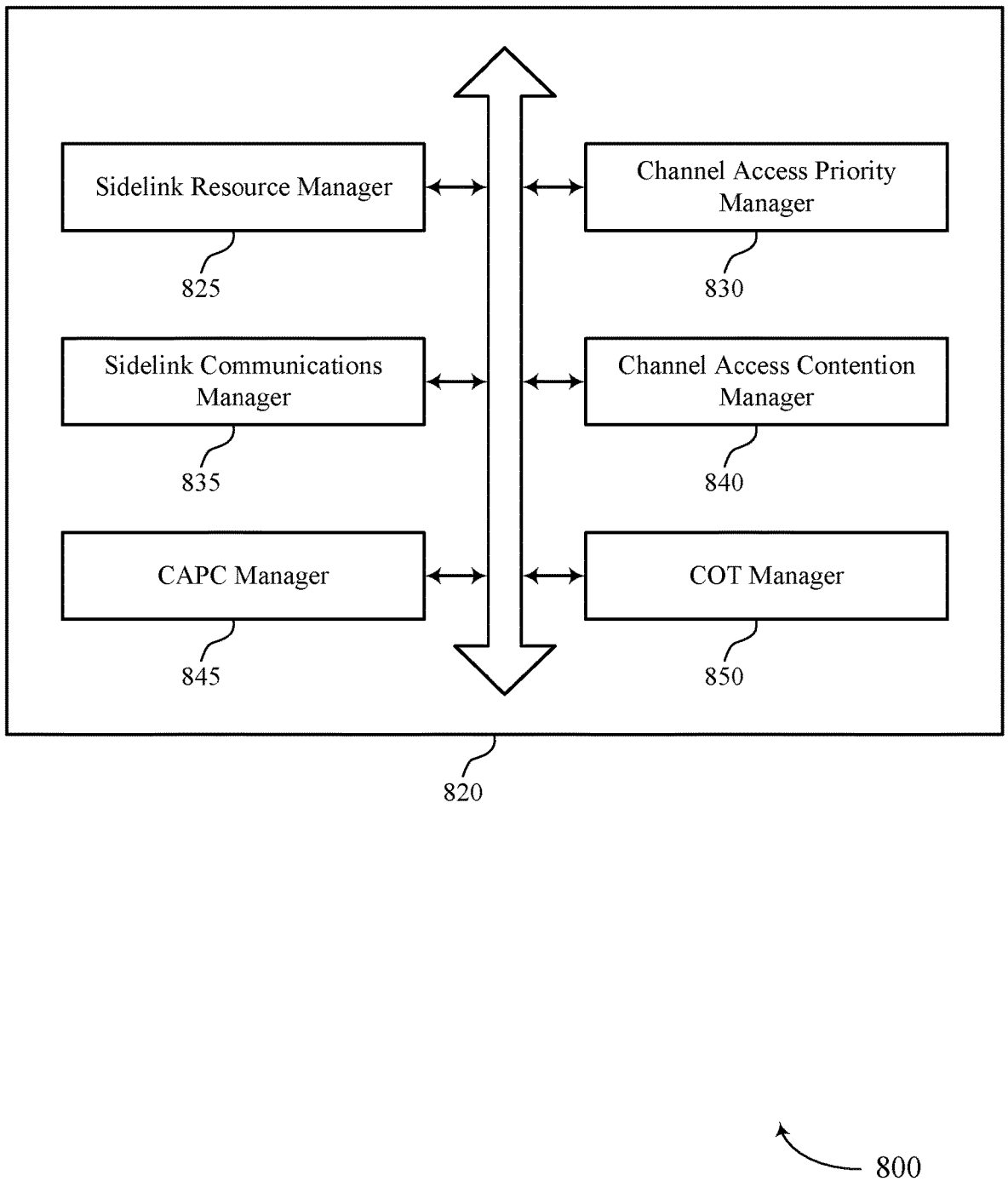
FIG. 8 shows a block diagram of a communications manager that supports coordinated channel access techniques for sidelink communications in accordance with one or more aspects of the present disclosure.

FIG. 8 shows a block diagram 800 of a communications manager 820 that supports coordinated channel access techniques for sidelink communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of coordinated channel access techniques for sidelink communications as described herein. For example, the communications manager 820 may include a sidelink resource manager 825, a channel access priority manager 830, a sidelink communications manager 835, a channel access contention manager 840, a CAPC manager 845, a COT manager 850, or any combination thereof. Each of these components may communicate, directly or indirectly, with one another (e.g., via one or more buses).

The communications manager 820 may support wireless communication at a first UE in accordance with examples as disclosed herein. The sidelink resource manager 825 may be configured as or otherwise support a means for receiving an indication of a set of available resources for communications with a second UE using a unicast connection via a sidelink channel. The channel access priority manager 830 may be configured as or otherwise support a means for transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The sidelink communications manager 835 may be configured as or otherwise support a means for communicating with the second UE via the sidelink channel, where access to the sidelink channel is based on the channel access procedure and the pattern of resources.

In some examples, to support transmitting, the channel access priority manager 830 may be configured as or otherwise support a means for transmitting a time domain pattern of resources to the second UE, where the first subset of resources include a subset of time domain intervals within the set of available resources. In some examples, the second UE is to refrain from initiating the channel access procedure within the first subset of resources.

In some examples, the channel access contention manager 840 may be configured as or otherwise support a means for selecting a first contention window duration associated with the channel access procedure, and where the first contention window duration is shorter than a second contention window duration of the second UE. In some examples, the channel access contention manager 840 may be configured as or otherwise support a means for initiating the channel access procedure based on the first contention window duration.

In some examples, to support transmitting, the channel access priority manager 830 may be configured as or otherwise support a means for transmitting a preferred resource indication to the second UE that identifies resources that are available for the second UE to perform the channel access procedure. In some examples, the first subset of resources are associated with resources that are non-preferred resources at the second UE and the second UE is to refrain from performing the channel access procedure in the non-preferred resources.

In some examples, the channel access procedure includes a LBT procedure that indicates channel availability of a shared radio frequency spectrum band that contains the set of available resources, and where the first UE uses first LBT parameters that provide a higher probability of channel access than second LBT parameters of the second UE for the first subset of resources. In some examples, the first LBT parameters include a first ED threshold that is higher than a second ED threshold of the second LBT parameters. In some examples, the first UE uses a lower CAPC for the channel access procedure than a CAPC of the second UE. In some examples, the first UE uses a longer CP duration from a first automatic gain control symbol in the first subset of resources than a CP duration of the second UE.

In some examples, the COT manager 850 may be configured as or otherwise support a means for transmitting, to the second UE, a COT sharing indication that indicates the second UE can attempt channel access in a COT that the first UE obtained, and where the second UE is to refrain from performing the channel access procedure in an absence of the COT sharing indication. In some examples, the first UE uses a CAPC that provides a shorter deferral value or a smaller contention window for the channel access procedure than the second UE.

In some examples, the channel access priority manager 830 may be configured as or otherwise support a means for determining to prioritize the first UE for the first subset of resources based on a number of connections with other UEs that are served at the first UE. In some examples, the sidelink resource manager 825 may be configured as or otherwise support a means for transmitting, to the second UE, a reconfiguration message that indicates a changed priority associated with one or more subsets of resources of the set of available resources. In some examples, the COT manager 850 may be configured as or otherwise support a means for transmitting, responsive to obtaining channel access based on the channel access procedure, a COT sharing indication to the second UE that indicates the pattern of resources within an obtained COT in which the first UE has a higher priority than the second UE for initiating the channel access procedure.

Figure 9:
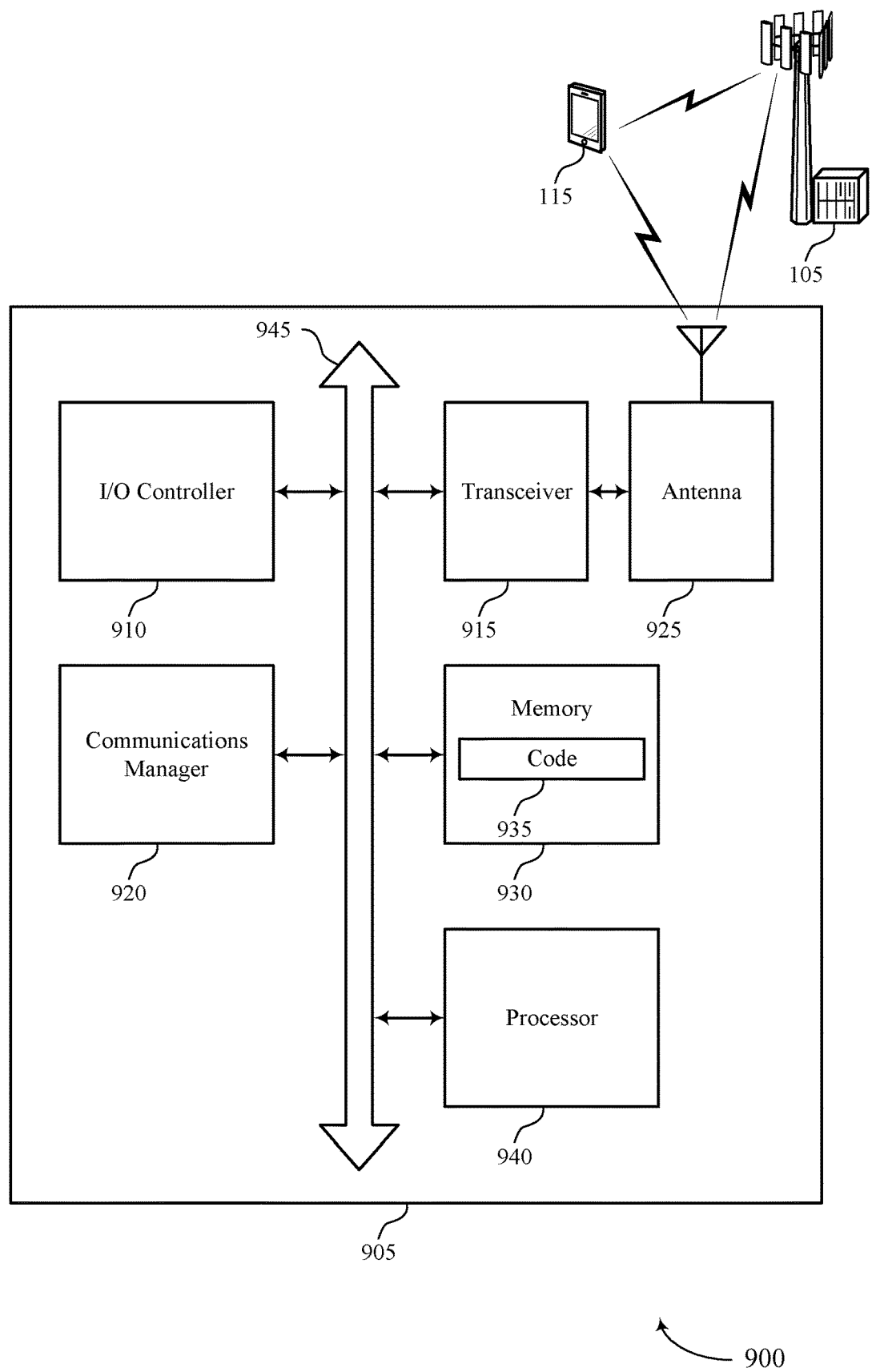
FIG. 9 shows a diagram of a system including a device that supports coordinated channel access techniques for sidelink communications in accordance with one or more aspects of the present disclosure.

FIG. 9 shows a diagram of a system 900 including a device 905 that supports coordinated channel access techniques for sidelink communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting coordinated channel access techniques for sidelink communications). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving an indication of a set of available resources for communications with a second UE using a unicast connection via a sidelink channel. The communications manager 920 may be configured as or otherwise support a means for transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The communications manager 920 may be configured as or otherwise support a means for communicating with the second UE via the sidelink channel, where access to the sidelink channel is based on the channel access procedure and the pattern of resources.

By including or configuring the communications manager 920 in accordance with examples as described herein, the device 905 may support techniques for sidelink channel access prioritization that provide for enhanced reliability and efficiency for sidelink communications. For example, a first UE that transmits more data than a second UE with prioritized channel access may allow for more efficient use of the wireless resources and also enhance QoS of the communications, provide mitigation for half-duplex deafness, enhance overall efficiency of the network, reduce latency, reduce overhead associated with repeated transmissions that may be necessary if communications are not received at a receiving device, or any combinations thereof In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of coordinated channel access techniques for sidelink communications as described herein, or the processor 940 and the memory 930 may be otherwise configured to perform or support such operations.

Figure 10:
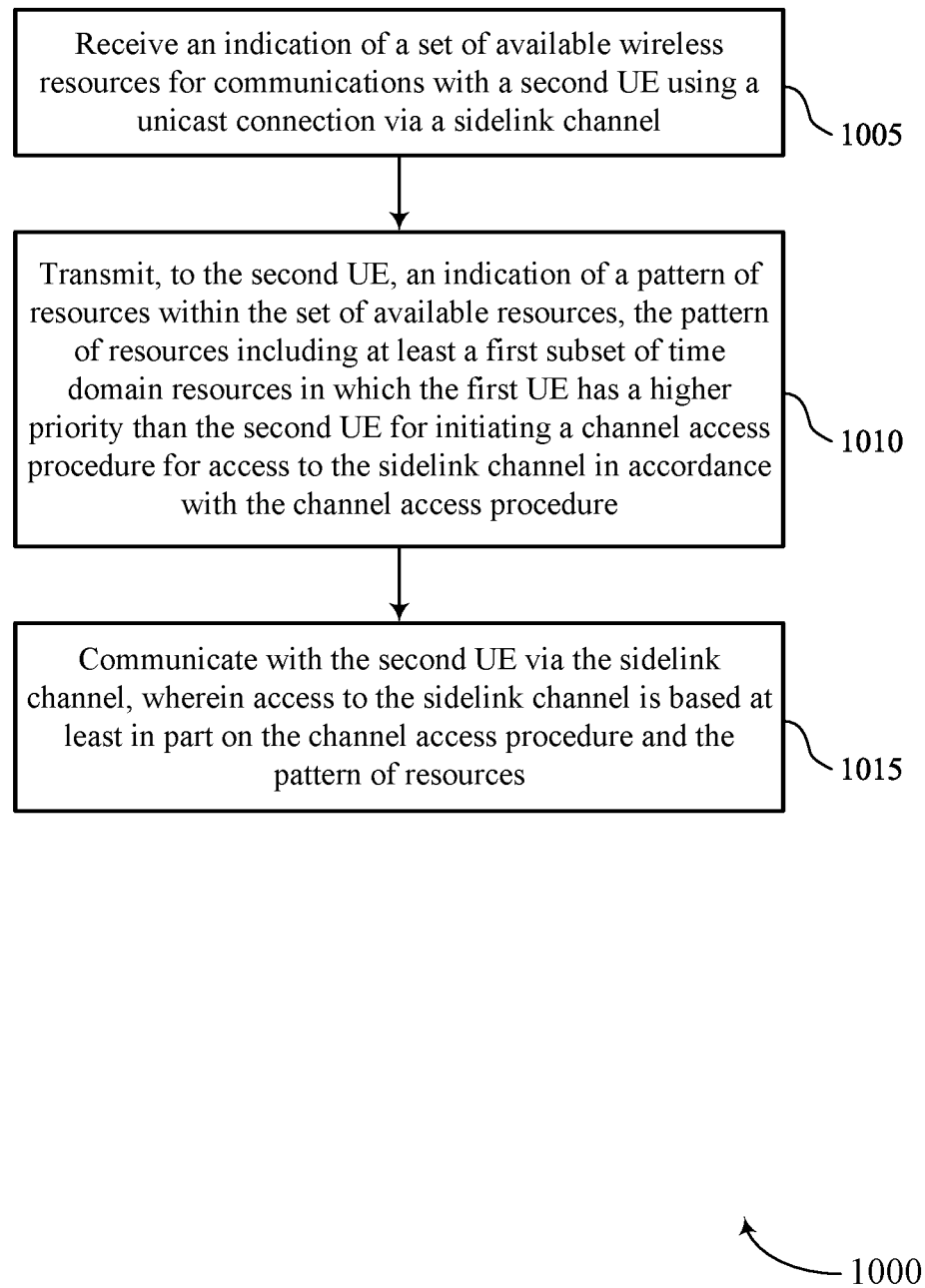
FIGS. 10 through 15 show flowcharts illustrating methods that support coordinated channel access techniques for sidelink communications in accordance with one or more aspects of the present disclosure.

FIG. 10 shows a flowchart illustrating a method 1000 that supports coordinated channel access techniques for sidelink communications in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving an indication of a set of available resources for communications with a second UE using a unicast connection via a sidelink channel. The operations of 1005 may be performed in accordance with examples as disclosed herein. In some examples, aspects of the operations of 1005 may be performed by a sidelink resource manager 825 as described with reference to FIG. 8.

At 1010, the method may include transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The operations of 1010 may be performed in accordance with examples as disclosed herein. In some examples, aspects of the operations of 1010 may be performed by a channel access priority manager 830 as described with reference to FIG. 8.

At 1015, the method may include communicating with the second UE via the sidelink channel, where access to the sidelink channel is based on the channel access procedure and the pattern of resources. The operations of 1015 may be performed in accordance with examples as disclosed herein. In some examples, aspects of the operations of 1015 may be performed by a sidelink communications manager 835 as described with reference to FIG. 8.

Figure 11:
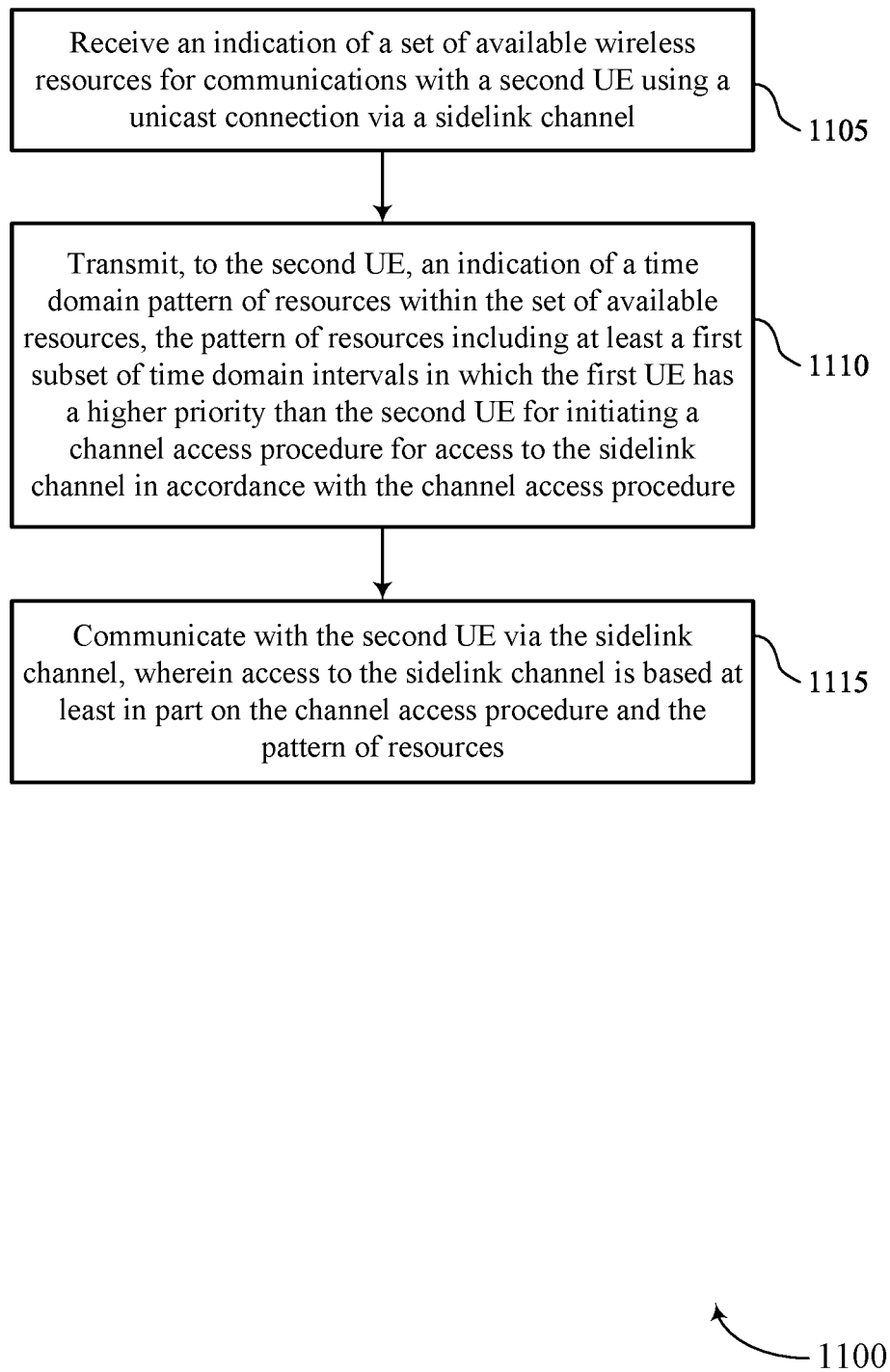

FIG. 11 shows a flowchart illustrating a method 1100 that supports coordinated channel access techniques for sidelink communications in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving an indication of a set of available resources for communications with a second UE using a unicast connection via a sidelink channel. The operations of 1105 may be performed in accordance with examples as disclosed herein. In some examples, aspects of the operations of 1105 may be performed by a sidelink resource manager 825 as described with reference to FIG. 8.

At 1110, the method may include transmitting, to the second UE, an indication of a time domain pattern of resources within the set of available resources, the pattern of resources including at least a first subset of time domain intervals in which the first UE has a higher priority than the second UE for initiating a channel access procedure for access to the sidelink channel in accordance with the channel access procedure. The operations of 1110 may be performed in accordance with examples as disclosed herein. In some examples, aspects of the operations of 1110 may be performed by a channel access priority manager 830 as described with reference to FIG. 8.

At 1115, the method may include communicating with the second UE via the sidelink channel, where access to the sidelink channel is based on the channel access procedure and the pattern of resources. The operations of 1115 may be performed in accordance with examples as disclosed herein. In some examples, aspects of the operations of 1115 may be performed by a sidelink communications manager 835 as described with reference to FIG. 8.

Figure 12:
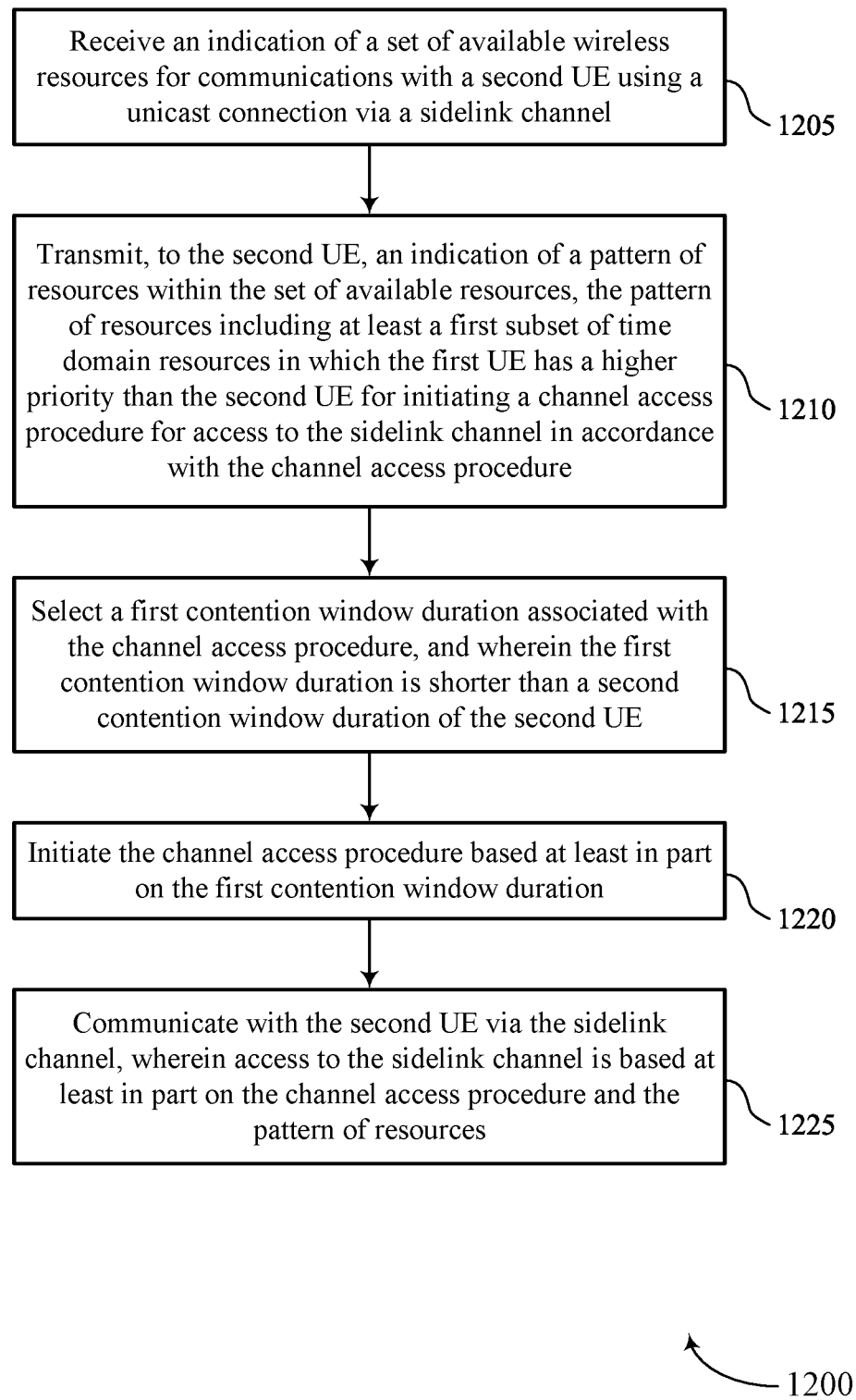

FIG. 12 shows a flowchart illustrating a method 1200 that supports coordinated channel access techniques for sidelink communications in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving an indication of a set of available resources for communications with a second UE using a unicast connection via a sidelink channel. The operations of 1205 may be performed in accordance with examples as disclosed herein. In some examples, aspects of the operations of 1205 may be performed by a sidelink resource manager 825 as described with reference to FIG. 8.

At 1210, the method may include transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The operations of 1210 may be performed in accordance with examples as disclosed herein. In some examples, aspects of the operations of 1210 may be performed by a channel access priority manager 830 as described with reference to FIG. 8.

At 1215, the method may include selecting a first contention window duration associated with the channel access procedure, and where the first contention window duration is shorter than a second contention window duration of the second UE. The operations of 1215 may be performed in accordance with examples as disclosed herein. In some examples, aspects of the operations of 1215 may be performed by a channel access contention manager 840 as described with reference to FIG. 8.

At 1220, the method may include initiating the channel access procedure based on the first contention window duration. The operations of 1220 may be performed in accordance with examples as disclosed herein. In some examples, aspects of the operations of 1220 may be performed by a channel access contention manager 840 as described with reference to FIG. 8.

At 1225, the method may include communicating with the second UE via the sidelink channel, where access to the sidelink channel is based on the channel access procedure and the pattern of resources. The operations of 1225 may be performed in accordance with examples as disclosed herein. In some examples, aspects of the operations of 1225 may be performed by a sidelink communications manager 835 as described with reference to FIG. 8.

Figure 13:
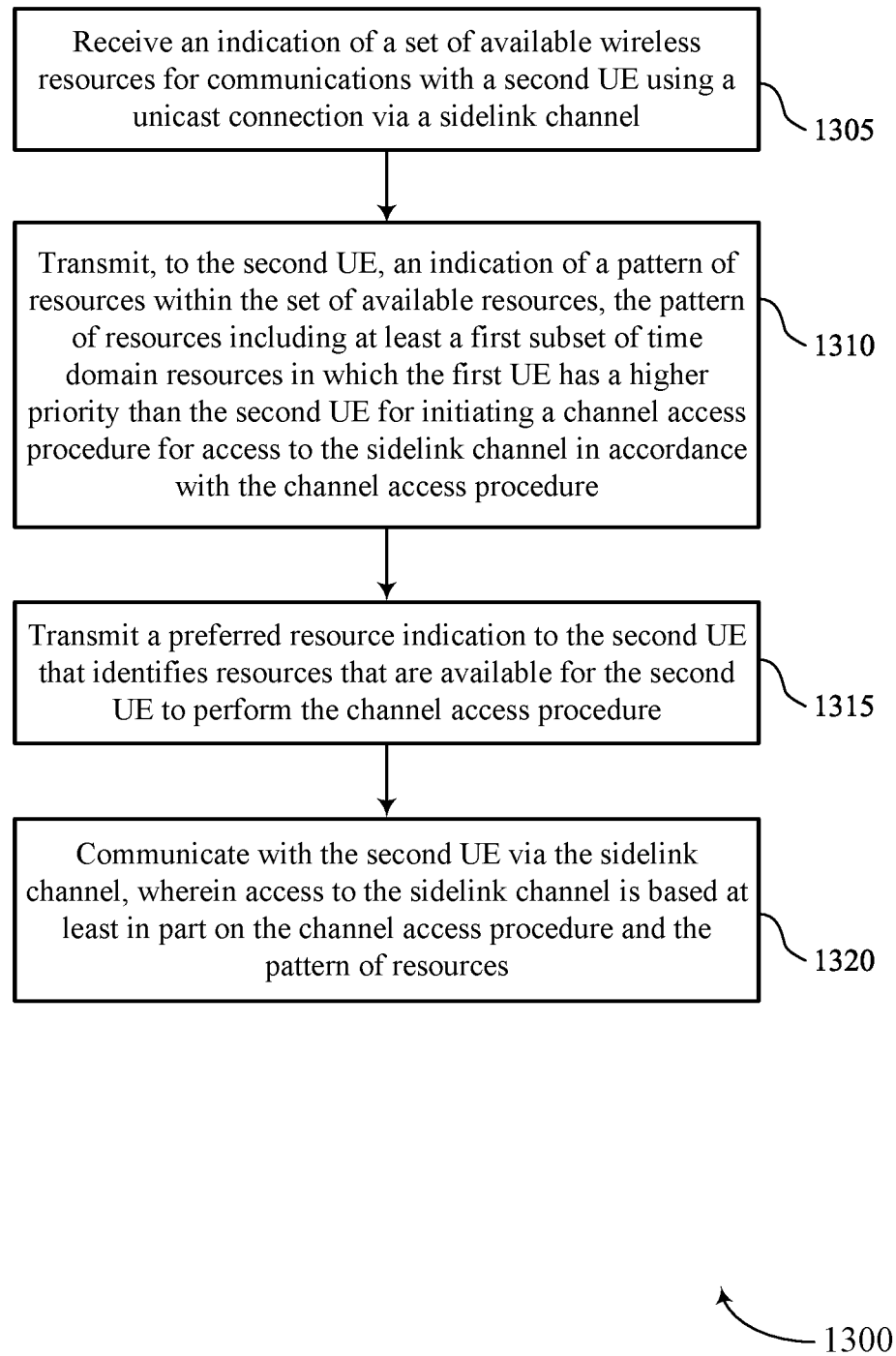

FIG. 13 shows a flowchart illustrating a method 1300 that supports coordinated channel access techniques for sidelink communications in accordance with one or more aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving an indication of a set of available resources for communications with a second UE using a unicast connection via a sidelink channel. The operations of 1305 may be performed in accordance with examples as disclosed herein. In some examples, aspects of the operations of 1305 may be performed by a sidelink resource manager 825 as described with reference to FIG. 8.

At 1310, the method may include transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The operations of 1310 may be performed in accordance with examples as disclosed herein. In some examples, aspects of the operations of 1310 may be performed by a channel access priority manager 830 as described with reference to FIG. 8.

At 1315, the method may include transmitting a preferred resource indication to the second UE that identifies resources that are available for the second UE to perform the channel access procedure. The operations of 1315 may be performed in accordance with examples as disclosed herein. In some examples, aspects of the operations of 1315 may be performed by a channel access priority manager 830 as described with reference to FIG. 8.

At 1320, the method may include communicating with the second UE via the sidelink channel, where access to the sidelink channel is based on the channel access procedure and the pattern of resources. The operations of 1320 may be performed in accordance with examples as disclosed herein. In some examples, aspects of the operations of 1320 may be performed by a sidelink communications manager 835 as described with reference to FIG. 8.

Figure 14:
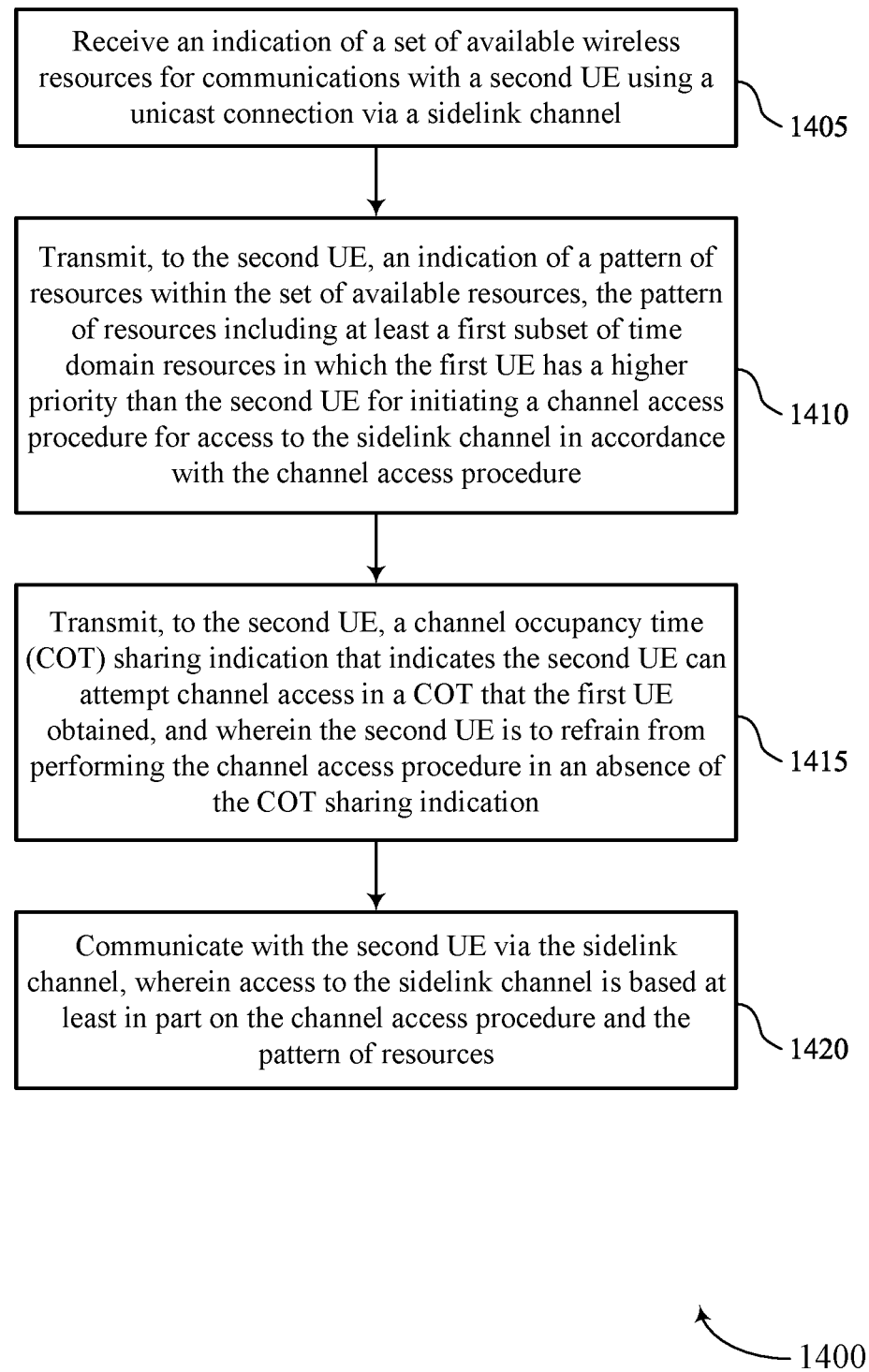

FIG. 14 shows a flowchart illustrating a method 1400 that supports coordinated channel access techniques for sidelink communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of a set of available resources for communications with a second UE using a unicast connection via a sidelink channel. The operations of 1405 may be performed in accordance with examples as disclosed herein. In some examples, aspects of the operations of 1405 may be performed by a sidelink resource manager 825 as described with reference to FIG. 8.

At 1410, the method may include transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The operations of 1410 may be performed in accordance with examples as disclosed herein. In some examples, aspects of the operations of 1410 may be performed by a channel access priority manager 830 as described with reference to FIG. 8.

At 1415, the method may include transmitting, to the second UE, a channel occupancy time (COT) sharing indication that indicates the second UE can attempt channel access in a COT that the first UE obtained, and where the second UE is to refrain from performing the channel access procedure in an absence of the COT sharing indication. The operations of 1415 may be performed in accordance with examples as disclosed herein. In some examples, aspects of the operations of 1415 may be performed by a COT manager 850 as described with reference to FIG. 8.

At 1420, the method may include communicating with the second UE via the sidelink channel, where access to the sidelink channel is based on the channel access procedure and the pattern of resources. The operations of 1420 may be performed in accordance with examples as disclosed herein. In some examples, aspects of the operations of 1420 may be performed by a sidelink communications manager 835 as described with reference to FIG. 8.

Figure 15:
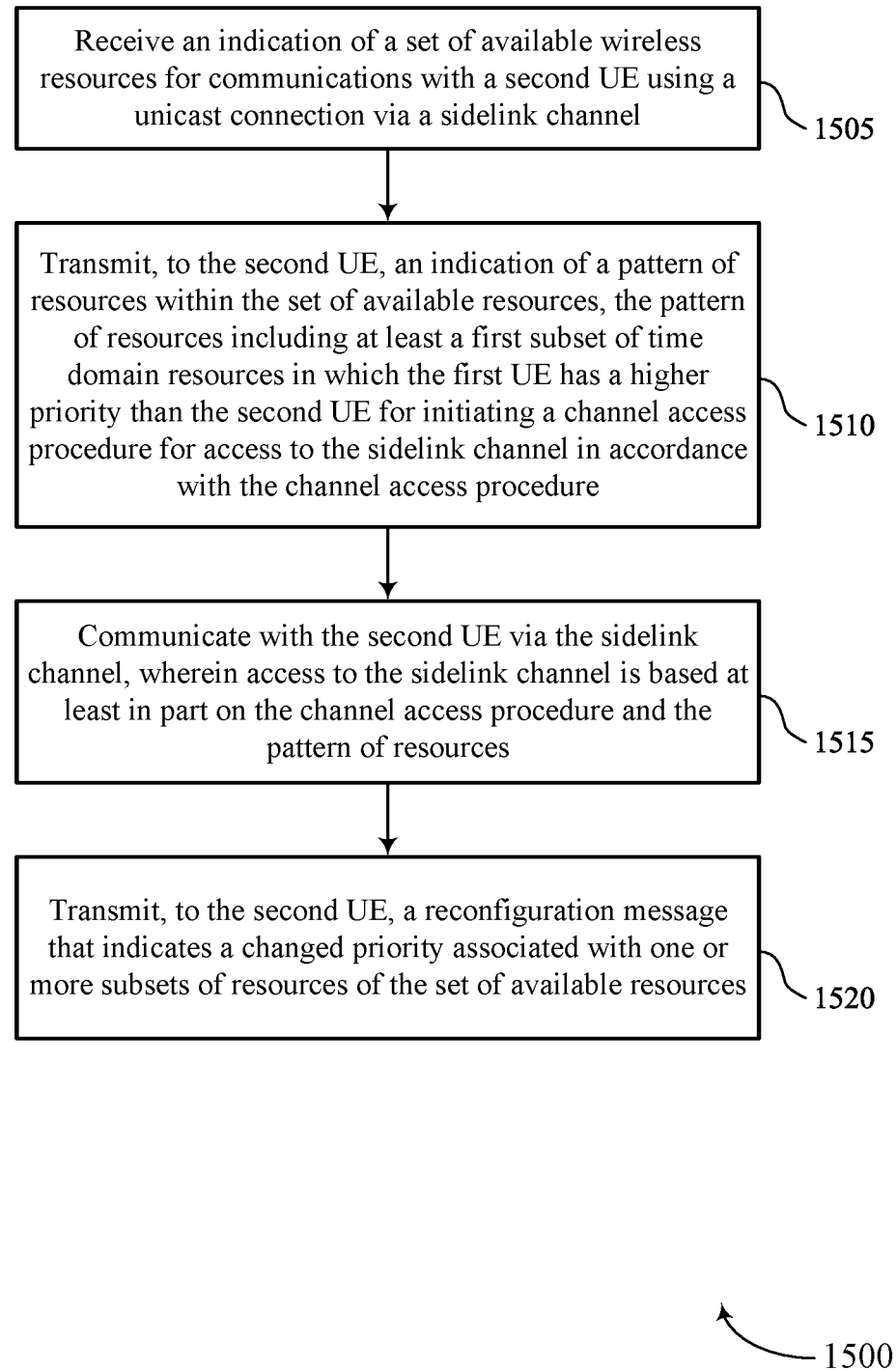

FIG. 15 shows a flowchart illustrating a method 1500 that supports coordinated channel access techniques for sidelink communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an indication of a set of available resources for communications with a second UE using a unicast connection via a sidelink channel. The operations of 1505 may be performed in accordance with examples as disclosed herein. In some examples, aspects of the operations of 1505 may be performed by a sidelink resource manager 825 as described with reference to FIG. 8.

At 1510, the method may include transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure. The operations of 1510 may be performed in accordance with examples as disclosed herein. In some examples, aspects of the operations of 1510 may be performed by a channel access priority manager 830 as described with reference to FIG. 8.

At 1515, the method may include communicating with the second UE via the sidelink channel, where access to the sidelink channel is based on the channel access procedure and the pattern of resources. The operations of 1515 may be performed in accordance with examples as disclosed herein. In some examples, aspects of the operations of 1515 may be performed by a sidelink communications manager 835 as described with reference to FIG. 8.

At 1520, the method may include transmitting, to the second UE, a reconfiguration message that indicates a changed priority associated with one or more subsets of resources of the set of available resources. The operations of 1520 may be performed in accordance with examples as disclosed herein. In some examples, aspects of the operations of 1520 may be performed by a sidelink resource manager 825 as described with reference to FIG. 8.

The following provides an overview of aspects of the present disclosure:

Aspect 1: A method for wireless communication at a first UE, comprising: receiving an indication of a set of available wireless resources for communications with a second UE using a unicast connection via a sidelink channel; transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with a channel access procedure; and communicating with the second UE via the sidelink channel, wherein access to the sidelink channel is based at least in part on the channel access procedure and the pattern of resources.

Aspect 2: The method of aspect 1, wherein the transmitting comprises: transmitting a time domain pattern of resources to the second UE, wherein the first subset of resources include a subset of time domain intervals within the set of available resources.

Aspect 3: The method of any of aspects 1 through 2, wherein the second UE is to refrain from initiating the channel access procedure within the first subset of resources.

Aspect 4: The method of any of aspects 1 through 3, further comprising: selecting a first contention window duration associated with the channel access procedure, and wherein the first contention window duration is shorter than a second contention window duration of the second UE; and initiating the channel access procedure based at least in part on the first contention window duration.

Aspect 5: The method of any of aspects 1 through 4, wherein the transmitting comprises: transmitting a preferred resource indication to the second UE that identifies resources that are available for the second UE to perform the channel access procedure.

Aspect 6: The method of aspect 5, wherein the first subset of resources are associated with resources that are non-preferred resources at the second UE and the second UE is to refrain from performing the channel access procedure in the non-preferred resources.

Aspect 7: The method of any of aspects 1 through 6, wherein the channel access procedure includes a listen before talk (LBT) procedure that indicates channel availability of a shared radio frequency spectrum band that contains the set of available wireless resources, and wherein the first UE uses first LBT parameters that provide a higher probability of channel access than second LBT parameters of the second UE for the first subset of resources.

Aspect 8: The method of aspect 7, wherein the first LBT parameters include a first energy detection (ED) threshold that is higher than a second ED threshold of the second LBT parameters.

Aspect 9: The method of any of aspects 1 through 8, wherein the first UE uses a lower channel access priority class (CAPC) for the channel access procedure than a CAPC of the second UE.

Aspect 10: The method of any of aspects 1 through 9, wherein the first UE uses a longer cyclic prefix (CP) duration from a first automatic gain control symbol in the first subset of resources than a CP duration of the second UE.

Aspect 11: The method of any of aspects 1 through 10, further comprising: transmitting, to the second UE, a channel occupancy time (COT) sharing indication that indicates the second UE can attempt channel access in a COT that the first UE obtained, and wherein the second UE is to refrain from performing the channel access procedure in an absence of the COT sharing indication.

Aspect 12: The method of any of aspects 1 through 11, wherein the first UE uses a channel access priority class (CAPC) that provides a shorter deferral value or a smaller contention window for the channel access procedure than the second UE.

Aspect 13: The method of any of aspects 1 through 12, further comprising: determining to prioritize the first UE for the first subset of resources based at least in part on a number of connections with other UEs that are served at the first UE.

Aspect 14: The method of any of aspects 1 through 13, further comprising: transmitting, to the second UE, a reconfiguration message that indicates a changed priority associated with one or more subsets of resources of the set of available resources.

Aspect 15: The method of any of aspects 1 through 14, further comprising: transmitting, responsive to obtaining channel access based on the channel access procedure, a channel occupancy time (COT) sharing indication to the second UE that indicates the pattern of resources within an obtained COT in which the first UE has a higher priority than the second UE for initiating the channel access procedure.

Aspect 16: An apparatus for wireless communication at a first UE, comprising a processor; memory coupled with the processor; and instructions stored in the memory and executable by the processor to cause the apparatus to perform a method of any of aspects 1 through 15.

Aspect 17: An apparatus for wireless communication at a first UE, comprising at least one means for performing a method of any of aspects 1 through 15.

Aspect 18: A non-transitory computer-readable medium storing code for wireless communication at a first UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which case disks may reproduce data magnetically, whereas discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving an indication of a set of available resources for communications with a second UE using a unicast connection via a sidelink channel;
   transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure, wherein the channel access procedure includes a listen before talk (LBT) procedure that indicates channel availability of a shared radio frequency spectrum band that contains the set of available resources, and wherein the first UE uses first LBT parameters that provide a higher probability of channel access than second LBT parameters of the second UE for the first subset of resources; and
   communicating with the second UE via the sidelink channel, wherein access to the sidelink channel is based at least in part on the channel access procedure and the pattern of resources.

2. The method of claim 1, wherein the transmitting comprises:
   transmitting a time domain pattern of resources to the second UE, wherein the first subset of resources include a subset of time domain intervals within the set of available resources.

3. The method of claim 1, wherein the second UE is to refrain from initiating the channel access procedure within the first subset of resources.

4. The method of claim 1, further comprising:
selecting a first contention window duration associated with the channel access procedure, and wherein the first contention window duration is shorter than a second contention window duration of the second UE; and
initiating the channel access procedure based at least in part on the first contention window duration.

5. The method of claim 1, wherein the transmitting comprises:
transmitting a preferred resource indication to the second UE that identifies resources that are available for the second UE to perform the channel access procedure.

6. The method of claim 5, wherein the first subset of resources are associated with resources that are non-preferred resources at the second UE and the second UE is to refrain from performing the channel access procedure in the non-preferred resources.

7. The method of claim 1, wherein the first LBT parameters include a first energy detection (ED) threshold that is higher than a second ED threshold of the second LBT parameters.

8. The method of claim 1, wherein the first UE uses a lower channel access priority class (CAPC) for the channel access procedure than a CAPC of the second UE.

9. The method of claim 1, wherein the first UE uses a longer cyclic prefix (CP) duration from a first automatic gain control symbol in the first subset of resources than a CP duration of the second UE.

10. The method of claim 1, further comprising:
transmitting, to the second UE, a channel occupancy time (COT) sharing indication that indicates the second UE can attempt channel access in a COT that the first UE obtained, and wherein the second UE is to refrain from performing the channel access procedure in an absence of the COT sharing indication.

11. The method of claim 1, wherein the first UE uses a channel access priority class (CAPC) that provides a shorter deferral value or a smaller contention window for the channel access procedure than the second UE.

12. The method of claim 1, further comprising:
determining to prioritize the first UE for the first subset of resources based at least in part on a number of connections with other UEs that are served at the first UE.

13. The method of claim 1, further comprising:
transmitting, to the second UE, a reconfiguration message that indicates a changed priority associated with one or more subsets of resources of the set of available resources.

14. The method of claim 1, further comprising:
transmitting, responsive to obtaining channel access based on the channel access procedure, a channel occupancy time (COT) sharing indication to the second UE that indicates the pattern of resources within an obtained COT in which the first UE has a higher priority than the second UE for initiating the channel access procedure.

15. An apparatus for wireless communication at a first user equipment (UE), comprising:
a processor;
memory coupled with the processor; and
instructions stored in the memory and executable by the processor to cause the apparatus to:
receive an indication of a set of available resources for communications with a second UE using a unicast connection via a sidelink channel;
transmit, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure, wherein the channel access procedure includes a listen before talk (LBT) procedure that indicates channel availability of a shared radio frequency spectrum band that contains the set of available resources, and wherein the first UE uses first LBT parameters that provide a higher probability of channel access than second LBT parameters of the second UE for the first subset of resources; and
communicate with the second UE via the sidelink channel, wherein access to the sidelink channel is based at least in part on the channel access procedure and the pattern of resources.

16. The apparatus of claim 15, wherein the instructions to transmit are executable by the processor to cause the apparatus to:
transmit a time domain pattern of resources to the second UE, wherein the first subset of resources include a subset of time domain intervals within the set of available resources.

17. The apparatus of claim 15, wherein the instructions are further executable by the processor to cause the apparatus to:
select a first contention window duration associated with the channel access procedure, and wherein the first contention window duration is shorter than a second contention window duration of the second UE; and
initiate the channel access procedure based at least in part on the first contention window duration.

18. The apparatus of claim 15, wherein the instructions to transmit are executable by the processor to cause the apparatus to:
transmit a preferred resource indication to the second UE that identifies resources that are available for the second UE to perform the channel access procedure.

19. The apparatus of claim 15, wherein the first LBT parameters include one or more of a first energy detection (ED) threshold that is higher than a second ED threshold of the second LBT parameters.

20. The apparatus of claim 15, wherein the first UE uses one or more of a lower channel access priority class (CAPC) for the channel access procedure than a CAPC of the second UE, or a longer cyclic prefix (CP) duration from a first automatic gain control symbol in the first subset of resources than a CP duration of the second UE.

21. The apparatus of claim 15, wherein the instructions are further executable by the processor to cause the apparatus to:
transmit, to the second UE, a channel occupancy time (COT) sharing indication that indicates the second UE can attempt channel access in a COT that the first UE obtained, and wherein the second UE is to refrain from performing the channel access procedure in an absence of the COT sharing indication.

22. The apparatus of claim 15, wherein the instructions are further executable by the processor to cause the apparatus to:
transmit, to the second UE, a reconfiguration message that indicates a changed priority associated with one or more subsets of resources of the set of available resources.

23. An apparatus for wireless communication at a first user equipment (UE), comprising:

means for receiving an indication of a set of available resources for communications with a second UE using a unicast connection via a sidelink channel;

means for transmitting, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure, wherein the channel access procedure includes a listen before talk (LBT) procedure that indicates channel availability of a shared radio frequency spectrum band that contains the set of available resources, and wherein the first UE uses first LBT parameters that provide a higher probability of channel access than second LBT parameters of the second UE for the first subset of resources; and means for communicating with the second UE via the sidelink channel, wherein access to the sidelink channel is based at least in part on the channel access procedure and the pattern of resources.

24. The apparatus of claim 23, wherein the means for the transmitting comprise:

means for transmitting a time domain pattern of resources to the second UE, wherein the first subset of resources include a subset of time domain intervals within the set of available resources.

25. The apparatus of claim 23, wherein the means for the transmitting comprise:

means for transmitting a preferred resource indication to the second UE that identifies resources that are available for the second UE to perform the channel access procedure.

26. A non-transitory computer-readable medium storing code for wireless communication at a first user equipment (UE), the code comprising instructions executable by a processor to:

receive an indication of a set of available resources for communications with a second UE using a unicast connection via a sidelink channel;

transmit, to the second UE, an indication of a pattern of resources within the set of available resources, the pattern of resources including at least a first subset of time domain resources in which the first UE has a higher priority than the second UE for initiating a channel access procedure for access to the sidelink channel in accordance with the channel access procedure, wherein the channel access procedure includes a listen before talk (LBT) procedure that indicates channel availability of a shared radio frequency spectrum band that contains the set of available resources, and wherein the first UE uses first LBT parameters that provide a higher probability of channel access than second LBT parameters of the second UE for the first subset of resources; and communicate with the second UE via the sidelink channel, wherein access to the sidelink channel is based at least in part on the channel access procedure and the pattern of resources.

27. The non-transitory computer-readable medium of claim 26, wherein the instructions are further executable by the processor to:

select a first contention window duration associated with the channel access procedure, and wherein the first contention window duration is shorter than a second contention window duration of the second UE; and initiate the channel access procedure based at least in part on the first contention window duration.

28. The non-transitory computer-readable medium of claim 26, wherein the instructions are further executable by the processor to:

transmit, to the second UE, a reconfiguration message that indicates a changed priority associated with one or more subsets of resources of the set of available resources.

* * * * *